US008445129B2

(12) United States Patent
Watanabe et al.

(10) Patent No.: US 8,445,129 B2
(45) Date of Patent: *May 21, 2013

(54) CATHODE ACTIVE MATERIAL, METHOD OF MANUFACTURING IT, CATHODE, AND BATTERY

(75) Inventors: Haruo Watanabe, Kanagawa (JP); Kenji Ogisu, Tokyo (JP); Koji Morita, Fukushima (JP); Masanori Soma, Fukushima (JP); Yosuke Hosoya, Fukushima (JP); Hideto Azuma, Fukushima (JP); Tomoyo Ooyama, Fukushima (JP)

(73) Assignee: Sony Corporation (JP)

( * ) Notice: Subject to any disclaimer, the term of this patent is extended or adjusted under 35 U.S.C. 154(b) by 955 days.

This patent is subject to a terminal disclaimer.

(21) Appl. No.: 11/419,863

(22) Filed: May 23, 2006

(65) Prior Publication Data
US 2006/0275667 A1  Dec. 7, 2006

(30) Foreign Application Priority Data

May 27, 2005  (JP) ............... P2005-156030
May 27, 2005  (JP) ............... P2005-156031
May 27, 2005  (JP) ............... P2005-156033

(51) Int. Cl.
H01M 2/16    (2006.01)
H01M 4/13    (2010.01)
H01M 4/00    (2006.01)

(52) U.S. Cl.
USPC ....... 429/137; 429/231.95; 429/223; 429/224

(58) Field of Classification Search ............ None
See application file for complete search history.

(56) References Cited

U.S. PATENT DOCUMENTS

| 5,677,083 | A * | 10/1997 | Tomiyama | 429/231.3 |
| 6,677,082 | B2 * | 1/2004 | Thackeray et al. | 429/224 |
| 6,916,580 | B2 * | 7/2005 | Cho et al. | 429/231.1 |
| 2002/0071991 | A1 * | 6/2002 | Kweon et al. | 429/231.1 |
| 2003/0022063 | A1 * | 1/2003 | Paulsen et al. | 429/231.3 |
| 2003/0054251 | A1 * | 3/2003 | Ohzuku et al. | 429/231.1 |

(Continued)

FOREIGN PATENT DOCUMENTS

| JP | H10-236826 A | 9/1998 |
| JP | 2000-195517 | 7/2000 |

(Continued)

OTHER PUBLICATIONS

Japanese Office Action dated Apr. 10, 2012 for Japanese Application No. 2005-156031.

(Continued)

Primary Examiner — Melvin C Mayes
Assistant Examiner — Sheng H Davis
(74) Attorney, Agent, or Firm — Sheridan Ross P.C.

(57) ABSTRACT

A cathode active material capable of increasing a capacity and improving high temperature characteristics or cycle characteristics, a method of manufacturing it, a cathode using the cathode active material, and a battery using the cathode active material are provided. In a cathode active material contained in a cathode, a coating layer is provided on at least part of a complex oxide particle containing at least lithium (Li) and cobalt (Co). The coating layer is an oxide which contains lithium (Li) and at least one of nickel (Ni) and manganese (Mn).

8 Claims, 8 Drawing Sheets

U.S. PATENT DOCUMENTS

| | | | |
|---|---|---|---|
| 2004/0076882 A1* | 4/2004 | Hosoya et al. | 429/223 |
| 2004/0200998 A1* | 10/2004 | Park et al. | 252/500 |
| 2006/0105239 A1 | 5/2006 | Paulsen | |
| 2007/0122705 A1* | 5/2007 | Paulsen et al. | 429/231.3 |
| 2007/0141463 A1* | 6/2007 | Stevanovic | 429/217 |

FOREIGN PATENT DOCUMENTS

| | | |
|---|---|---|
| JP | 2001-167763 | 6/2001 |
| JP | 2001-329395 | 11/2001 |
| JP | 2002-100357 A | 4/2002 |
| JP | 2002-110167 | 4/2002 |
| JP | 2003-203634 | 7/2003 |
| JP | 2004-014405 | 1/2004 |
| JP | 2004-227869 A | 8/2004 |
| JP | 2004-303459 A | 10/2004 |
| JP | 2004-348981 | 12/2004 |
| JP | 2006-503789 | 2/2006 |
| WO | 2004-030126 A1 | 4/2004 |
| WO | WO2004/107480 * | 9/2004 |

OTHER PUBLICATIONS

Japanese Office Action dated Jul. 15, 2011 for Japanese Application No. JP2005-156030.

Japanese Office Action dated Jul. 14, 2011 for Japanese Application No. JP2005-156031.

Japanese Office Action dated Jul. 13, 2011 for Japanese Application No. JP2005-156033.

* cited by examiner

CATHODE ACTIVE MATERIAL, METHOD
OF MANUFACTURING IT, CATHODE, AND
BATTERY

CROSS REFERENCES TO RELATED
APPLICATIONS

The present invention contains subject matter related to Japanese Patent Application JP 2005-156030 filed in the Japanese Patent Office on May 27, 2005, Japanese Patent Application JP 2005-156031 filed in the Japanese Patent Office on May 27, 2005, and Japanese Patent Application JP 2005-156033 filed in the Japanese Patent Office on May 27, 2005, the entire contents both of which are incorporated herein by references.

BACKGROUND OF THE INVENTION

1. Field of the Invention

The present invention relates to a cathode active material which contains a complex oxide containing lithium (Li) and cobalt (Co), a method of manufacturing it, a cathode using the cathode active material, and a battery using the cathode active material.

2. Description of the Related Art

In recent years, portable devices such as a combination camera and a notebook personal computer have become widely used. Accordingly, small-sized secondary batteries with a high capacity have been increasingly demanded. The secondary batteries currently in use include nickel-cadmium batteries using an alkali electrolytic solution. However, the battery voltage thereof is 1.2V, which is low, and therefore it is difficult to improve the energy density. Therefore, it has been considered to develop so-called lithium metal secondary batteries using lithium metal. Such lithium metal has a specific gravity of 0.534, which is the lightest simple substance among solid simple substances. Further, the lithium metal has significantly poor electric potential and has the highest current capacity per unit weight among metal anode materials. However, in the lithium metal secondary batteries, there have been disadvantages as follows. That is, along with charge and discharge, lithium is grown on the anode dendritically, leading to lowered cycle characteristics. Otherwise, such grown lithium breaks the separator, causing internal short circuit. Therefore, secondary batteries in which a carbon material such as coke is used for an anode, alkali metal ions are inserted and extracted and thereby charge and discharge are repeated have been developed. In the result, deterioration of anodes due to charge and discharge has been reduced (for example, refer to Japanese Unexamined Patent Application Publication No. H10-333573).

In the lithium secondary batteries currently used generally, lithium cobaltate is used for the cathode, a carbon material is used for an anode, and the operating voltage is in the range from 4.2 V to 2.5 V. Regarding the cathode active material such as lithium cobaltate used for the cathode in such lithium secondary batteries operating at 4.2 V at maximum, only about 60% of the capacity is utilized to the theoretical capacity. Therefore, it is theoretically possible to utilize the remaining capacity by further increasing the charging voltage. In practice, it is known that a high energy density is realized by increasing the voltage in charging to 4.25 V or more (refer to International Publication No. WO03/197131). In particular, as a cathode active material, there are lithium nickelate, lithium manganate having a spinel structure and the like in addition to lithium cobaltate. Specially, lithium cobaltate is preferably used since lithium cobaltate can increase the electric potential most.

However, when the charging voltage is increased, there have been disadvantages as follows. That is, the oxidizing atmosphere in the vicinity of the cathode becomes strong. In the result, the electrolyte is easily deteriorated by oxidation decomposition, or cobalt is easily eluted from the cathode. Consequently, the charge and discharge efficiency is lowered, the cycle characteristics are lowered, and therefore it has been difficult to increase the charging voltage.

In the past, as a method for improving stability of cathode active materials, the following methods and the like have been reported. One method is that different elements such as aluminum (Al), magnesium (Mg), zirconium (Zr), and titanium (Ti) are dissolved (refer to Japanese Unexamined Patent Application Publication No. 2004-303459). Another method is that a small amount of a lithium-nickel-manganese complex oxide and the like is mixed (refer to Japanese Unexamined Patent Application Publication No. 2002-100357). Still another method is that the surface of lithium cobaltate is coated with lithium manganate having a spinel structure or nickel-cobalt complex oxide (refer to Japanese Unexamined Patent Application Publication Nos. H10-333573 and H10-372470).

SUMMARY OF THE INVENTION

However, in the method that different elements are dissolved, there has been a shortcoming as follows. That is, when the dissolved amount is small, the high temperature characteristics or the cycle characteristics may not be sufficiently improved, while when the dissolved amount is large, the capacity is decreased. In the method that a lithium-nickel-manganese complex oxide and the like are mixed, there has been a shortcoming that the characteristics may not be sufficiently improved. In the method that the surface of lithium cobaltate is coated with lithium manganate or lithium titanate, there has been a shortcoming that the capacity is decreased. In addition, in the case of using lithium manganate, there has been a disadvantage that the characteristics are lowered due to elution of manganese (refer to Japanese Patent Publication No. 2987358 and Japanese Unexamined Patent Application Publication No. 2004-227869). In addition, in the method that the surface of lithium cobaltate is coated with nickel-cobalt complex oxide, there have been disadvantages as follows. One disadvantage thereof is that the heat stability is lowered (refer to Japanese Unexamined Patent Application Publication No. H10-236826). Another disadvantage thereof is that since the discharge electric potential thereof is lower compared to lithium cobaltate, it is disadvantageous to increase the energy density.

In view of the foregoing, in the invention, it is desirable to provide a cathode active material capable of increasing a capacity and improving high temperature characteristics and cycle characteristics, a method of manufacturing it, a cathode using the cathode active material, and a battery using the cathode active material.

According to an embodiment of the invention, there is provided a cathode active material including: complex oxide particle made of an oxide containing at least lithium (Li) and cobalt (Co); and a coating layer which is provided on at least part of the complex oxide particle and is made of an oxide containing lithium and at least one of nickel and manganese.

More specifically, the average composition of the complex oxide particle is expressed by Chemical formula 1.

Otherwise, it is possible that the average composition of the complex oxide particle is expressed by Chemical formula 2, and the concentration of manganese in an external layer portion of the coating layer is higher than in an internal layer portion of the coating layer.

Further, it is possible that the average composition of the complex oxide particle is expressed by Chemical formula 3, and in diffraction peaks obtained by CuKα powder X-ray diffraction, there is a diffraction peak of the coating layer on the lower angle side in the range from 0.2 deg to 1.0 deg than diffraction angle 2θ of a diffraction peak belonging to face [101] of the complex oxide particle.

$$Li_{(1+w)}Co_{(1-x-y)}M1_xM2_yO_{(2-z)} \quad \text{(Chemical formula 1)}$$

In Chemical formula 1, M1 represents at least one selected from the group consisting of magnesium (Mg), aluminum (Al), titanium (Ti), and zirconium (Zr). M2 represents at least one selected from the group consisting of boron (B), vanadium (V), chromium (Cr), manganese (Mn), iron (Fe), nickel (Ni), copper (Cu), zinc (Zn), molybdenum (Mo), tin (Sn), tungsten (W), yttrium (Y), niobium (Nb), calcium (Ca), and strontium (Sr). Values of w, x, y, and z are respectively in the range of $-0.10 \leq w \leq 0.10$, $0.001 < x < 0.10$, $0 \leq y < 0.40$, and $-0.10 \leq z \leq 0.20$.

$$Li_{(1+x)}Co_{(1-y)}M_yO_{(2-z)} \quad \text{(Chemical formula 2)}$$

In Chemical formula 2, M represents at least one selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca), and strontium (Sr). Values of x, y, and z are respectively in the range of $-0.10 \leq x \leq 0.10$, $0 \leq y < 0.50$, and $-0.10 \leq z \leq 0.20$.

$$Li_{(1+x)}Co_{(1-y)}M_yO_{(2-z)} \quad \text{(Chemical formula 3)}$$

In Chemical formula 3, M represents at least one selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca), and strontium (Sr). Values of x, y, and z are respectively in the range of $-0.10 \leq x \leq 0.10$, $0 \leq y < 0.50$, and $-0.10 \leq z \leq 0.20$.

According to an embodiment of the invention, there is provided a method of manufacturing a cathode active material including the steps of: forming an internal precursor layer of a hydroxide containing nickel (Ni) and manganese (Mn) on at least part of complex oxide particle with the average composition expressed by Chemical formula 1 or Chemical formula 2 in an aqueous solution with the hydrogen-ion exponent pH of 12 or more; forming an external precursor layer of a hydroxide with higher concentration of manganese than that of the internal precursor layer on at least part of the complex oxide particle by changing the valence of manganese ions contained in the aqueous solution after forming the internal precursor layer; and forming a coating layer made of an oxide containing lithium, nickel, and manganese, in which the concentration of manganese of an external layer portion is larger than that of an internal layer portion on at least part of the complex oxide particle by heat treating the internal precursor layer and the external precursor layer.

$$Li_{(1+w)}Co_{(1-x-y)}M1_xM2_yO_{(2-z)} \quad \text{(Chemical formula 1)}$$

In Chemical formula 1, M1 represents at least one selected from the group consisting of magnesium (Mg), aluminum (Al), titanium (Ti), and zirconium (Zr). M2 represents at least one selected from the group consisting of boron (B), vanadium (V), chromium (Cr), manganese (Mn), iron (Fe), nickel (Ni), copper (Cu), zinc (Zn), molybdenum (Mo), tin (Sn), tungsten (W), yttrium (Y), niobium (Nb), calcium (Ca), and strontium (Sr). Values of w, x, y, and z are respectively in the range of $-0.10 \leq w \leq 0.10$, $0.001 < x < 0.10$, $0 \leq y \leq 0.40$, and $-0.10 \leq z \leq 0.20$.

$$Li_{(1+x)}Co_{(1-y)}M_yO_{(2-z)} \quad \text{(Chemical formula 2)}$$

In Chemical formula 2, M represents at least one selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca), and strontium (Sr). Values of x, y, and z are respectively in the range of $-0.10 \leq x \leq 0.10$, $0 \leq y < 0.50$, and $-0.10 \leq z \leq 0.20$.

According to an embodiment of the invention, there is provided a cathode containing the cathode active material of the embodiment of the invention described above.

According to an embodiment of the invention, there is provided a battery including a cathode, an anode, and an electrolyte in which the cathode contains the cathode active material of the embodiment of the invention described above.

According to the cathode active material of the embodiment of the invention, while characteristics of a high capacity and high electric potential of the complex oxide particle is maintained, chemical stability of the cathode active material can be improved. Further, even if breakage or destruction is generated by external force, activity of the surface thereby exposed can be low. Therefore, according to the battery of the embodiment of the invention using such a cathode active material, a high capacity and high electric potential can be obtained, high temperature characteristics or cycle characteristics can be improved, and chemical stability can be improved.

Other and further objects, features and advantages of the invention will appear more fully from the following description.

DETAILED DESCRIPTION OF THE PREFERRED EMBODIMENTS

Figure 1:
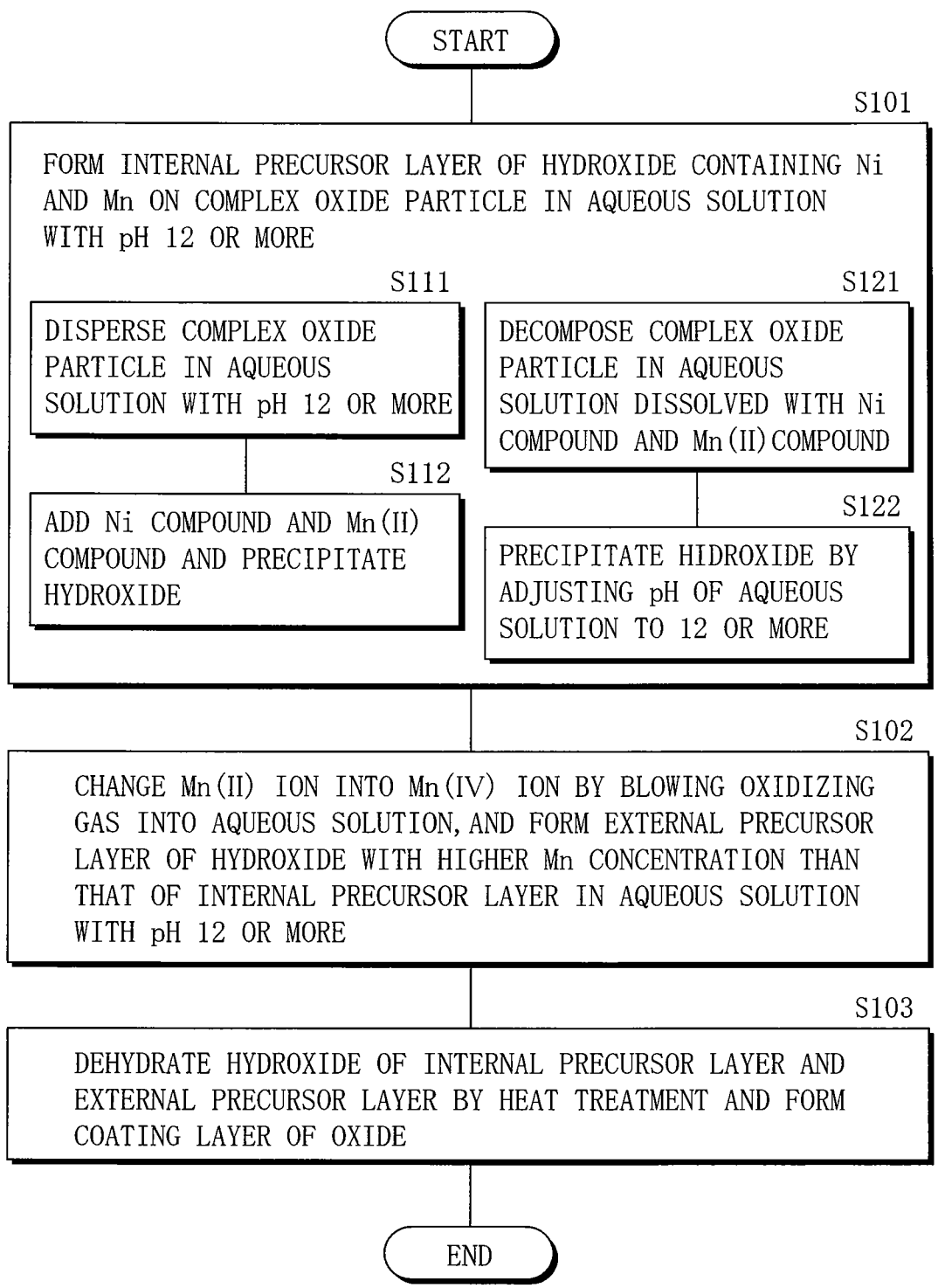
FIG. 1 is a flowchart showing a method of manufacturing a cathode active material according to an embodiment of the invention.

Embodiments of the invention will be hereinafter described in detail with reference to the drawings.

A cathode active material according to an embodiment of the invention includes complex oxide particle made of an oxide containing at least lithium (Li) and cobalt (Co) and a coating layer which is provided on at least part of the complex oxide particle and is made of an oxide containing lithium and at least one of nickel and manganese. More specifically, the cathode active material can be embodied as follows.

(First Cathode Active Material)

In a cathode active material according to a first embodiment of the invention, a coating layer is provided on at least part of the complex oxide particle whose average composition is expressed by Chemical formula 1. In the cathode active material, by structuring the average composition of the complex oxide particle as shown in Chemical formula 1, a high capacity and high discharge electric potential can be obtained, and the chemical stability can be improved.

$$Li_{(1+w)}Co_{(1-x-y)}M1_xM2_yO_{(2-z)}$$ (Chemical formula 1)

In Chemical formula 1, M1 represents at least one selected from the group consisting of magnesium, aluminum, titanium, and zirconium. M2 represents at least one selected from the group consisting of boron, vanadium, chromium, manganese, iron, nickel, copper, zinc, molybdenum, tin, tungsten, yttrium, niobium, calcium, and strontium.

A value of w is in the range of $-0.10 \leq w \leq 0.10$, preferably in the range of $-0.08 \leq w \leq 0.08$, and more preferably in the range of $-0.06 \leq w \leq 0.06$. When the value of w is smaller than the foregoing range, the discharging capacity is lowered. Meanwhile, when the value of w is larger than the foregoing range, lithium is diffused in forming the coating layer, and controlling the steps may be difficult.

A value of x is in the range of $0.001 < x < 0.10$, preferably in the range of $0.002 < x < 0.08$, and more preferably in the range of $0.003 < x < 0.06$. When the M1 content is smaller than the foregoing range, the chemical stability of the complex oxide particle is lowered. Meanwhile, when the M1 content is larger than the foregoing range, the capacity is lowered. The concentration of M1 in the complex oxide particle is not necessarily uniform, but the concentration thereof may be gradient between on the surface side and on the central side, for example. However, the concentration thereof is preferably approximately uniform on the whole, since activity of the surface exposed by breakage or the like can be lowered.

A value of y is in the range of $0 \leq y < 0.40$, preferably in the range of $0 \leq y < 0.30$, and more preferably in the range of $0 \leq y < 0.20$. That is, M2 is not an essential element in Chemical formula 1. In some cases, M2 is preferably contained in addition to M1, since the chemical stability can be more improved. However, when the M2 content is large, characteristics of lithium cobaltate are lost, and the capacity and the discharge electric potential are lowered.

A value of z is in the range of $-0.10 \leq z \leq 0.20$, preferably in the range of $-0.08 \leq z \leq 0.18$, and more preferably in the range of $-0.06 \leq z \leq 0.16$. In the foregoing range, the discharging capacity can be more improved.

The coating layer functions as a reaction suppression layer. The coating layer is composed of an oxide containing lithium, nickel, and manganese. The concentrations of nickel and manganese in the coating layer are changed in the depth direction. The concentration of manganese is higher in the external layer portion of the coating layer opposite to the internal layer portion thereof than in the internal layer portion of the coating layer on the complex oxide particle side. By setting the concentration of manganese in the external layer portion higher than the average composition of the coating layer, the charge and discharge efficiency can be more improved.

The coating layer functions as a reaction suppression layer. The coating layer is composed of an oxide containing lithium, and at least one of nickel and manganese. The composition ratio between nickel and manganese in the coating layer at a mol ratio of nickel : manganese is preferably in the range from 100:0 to 20:80, and more preferably in the range from 100:0 to 40:60. When the amount of manganese is large, the insertion amount of lithium in the coating layer is lowered, and the capacity of the cathode active material is lowered.

Further, as an element, at least one selected from the group consisting of magnesium, aluminum, boron, titanium, vanadium, chromium, iron, cobalt, copper, zinc, molybdenum, tin, tungsten, zirconium, yttrium, niobium, calcium, and strontium may be further contained in the oxide of the coating layer. Thereby, the stability of the cathode active material can be more improved, and the diffusion characteristics of lithium ions can be more improved. In this case, the total content of these additional elements to the total content of nickel, manganese, and these additional elements in the coating layer is preferably 40 mol % or less, more preferably 30 mol % or less, and much more preferably 20 mol % or less. When the content of these additional elements is large, the insertion amount of lithium is lowered, and the capacity of the cathode active material is lowered. These additional elements may be dissolved or may not be dissolved in the oxide.

The amount of the coating layer to the complex oxide particle is preferably in the range from 0.5 wt % to 50 wt %, more preferably in the range from 1.0 wt % to 40 wt %, and much more preferably in the range from 2.0 wt % to 35 wt %. When the amount of the coating layer is large, the capacity is lowered. Meanwhile, when the amount of the coating layer is small, the stability may not be improved sufficiently.

The coating layer means a region from the surface of the cathode active material to the inside thereof, in which the concentration change of nickel and manganese is no more seen substantially when the concentration change of nickel and manganese is examined from the surface to the inside of the cathode active material. The concentration change of nickel and manganese from the surface to the inside of the cathode active material can be obtained as follows. For example, the composition of the cathode active material can be measured by Auger Electron Spectroscopy (AES) or Secondary Ion weight Spectrometry (SIMS) while the cathode active material is scraped by sputtering or the like. Further, it is possible that the cathode active material is slowly dissolved in an acidic solution or the like, and the time change of the eluting portion is measured by Inductively Coupled Plasma (ICP) spectrometry or the like.

The average particle diameter of the cathode active material is preferably in the range from 2.0 μm to 50 μm. When the average particle diameter is less than 2.0 μm, the cathode active material is easily separated from the cathode current collector in the press step in forming the cathode. In addition, the surface area of the cathode active material becomes large and therefore, amounts of additives such as an electrical conductor and a binder should be increased, and thereby the energy density per unit weight is decreased. On the contrary, when the average particle diameter is more than 50 μm, the cathode active material passes through the separator, which increases possibility that short circuit is caused.

FIG. 1 shows steps of a method of manufacturing the cathode active material. First, an internal precursor layer of a hydroxide containing nickel and manganese is formed on at least part of the complex oxide particle with the average composition expressed by Chemical formula 1 in, for example, an aqueous solution with the hydrogen-ion exponent pH of 12 or more (step S101). By precipitating the hydroxide in the aqueous solution with the hydrogen-ion exponent pH of 12 or more as above, the precipitation rate of the hydroxide can be slowed, and a denser and more uniform internal precursor layer can be formed.

When the internal precursor layer is formed, as shown in FIG. 1, it is possible that the complex oxide particle is dispersed in the aqueous solution with the hydrogen-ion exponent pH of 12 or more (step S111), and then a nickel compound and a manganese compound are added to the aqueous solution and a hydroxide thereof is precipitated (step S112). Otherwise, it is possible that the complex oxide particle is dispersed in an aqueous solution dissolved with a nickel compound and a manganese compound (step S121), and then the hydrogen-ion exponent pH of the aqueous solution is adjusted to 12 or more to precipitate a hydride thereof (step S122).

As a nickel compound which is a raw material of nickel, an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate, and nickel thiocyanate; or an organic compound such as nickel oxalate and nickel acetate can be cited. One of the foregoing nickel compounds may be used singly, or two or more thereof may be used by mixing.

As a manganese compound which is a raw material of manganese, an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrongensulfide, manganese sulfate, manganese hydrogensulfate, manganese thiocyanate, manganese nitrite, manganese phosphate, manganese dihydrogenphosphate, and manganese bicarbonate; or an organic compound such as manganese oxalate and manganese acetate can be cited. Specially, a compound of manganese (II) is preferable, since a sufficient solubility to the aqueous solution can be obtained. One of the foregoing manganese compounds may be used singly, or two or more thereof may be used by mixing.

Next, for example, oxidizing gas such as air and oxygen is blown in the aqueous solution, and the valence of manganese ions is changed in the aqueous solution with the hydrogen-ion exponent pH of 12 or more. Thereby, for example, manganese (II) ions are oxidized to become manganese (IV) ions, and the solubility of manganese hydroxide to the aqueous solution is decreased. Therefore, an external precursor layer of a hydroxide with the manganese concentration higher than that of the internal precursor layer is formed on at least part of the complex oxide particle (step S102).

The hydrogen-ion exponent pH in forming the internal precursor layer and the external precursor layer is adjusted by adding alkali to the aqueous solution, for example. As alkali, for example, lithium hydroxide, sodium hydroxide, or potassium hydroxide can be cited. One thereof may be used singly, or two or more thereof may be used by mixing. However, lithium hydroxide is more preferably used. Thereby, the purity of the cathode active material can be improved. In addition, in this case, by adjusting the adhesive amount of the aqueous solution when the complex oxide particle formed with the internal precursor layer and the external precursor layer are separated from the aqueous solution, the lithium content in the coating layer can be controlled.

The hydrogen-ion exponent pH of the aqueous solution is preferably high, more preferably 13 or more, and much more preferably 14 or more. The higher the hydrogen-ion exponent pH is, the more uniform the internal precursor layer and the external precursor layer can be formed. Further, the temperatures of the aqueous solution in forming the internal precursor layer and the external precursor layer is preferably 40 deg C. or more, more preferably 60 deg C. or more, much more preferably 80 deg C. or more, and may be 100 deg C. or more. The higher the temperature is, the more uniform the precursor layer can be formed.

Subsequently, the complex oxide particle formed with the internal precursor layer and the external precursor layer are separated from the aqueous solution, and heat-treated. Thereby the hydroxide of the internal precursor layer and the external precursor layer is dehydrated, and a coating layer of an oxide containing lithium, nickel, and manganese is formed (step S103). The heat treatment is preferably performed about at temperatures from 300 deg C. to 1000 deg C. in the oxidizing atmosphere such as air and pure oxygen.

By such heat treatment, lithium is diffused from the complex oxide particle to the coating layer. Before providing heat treatment, a lithium compound may be impregnated in the internal precursor layer and the external precursor layer in order to adjust the lithium content in the coating layer. As a lithium compound, for example, an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate, and lithium bicarbonate; or an organic compound such as methyl lithium, vinyl lithium, isopropyl lithium, butyl lithium, phenyl lithium, lithium oxalate, and lithium acetate can be cited.

Before forming the precursor layer, secondary particle of the complex oxide particle may be pulverized by a ball mill, a crusher or the like if necessary. Further, after forming the coating layer, light pulverization, classification operation or the like may be performed if necessary, and thereby the particle size of the cathode active material may be adjusted.

The cathode active material can be obtained by, for example, forming a precursor layer of the coating layer on the foregoing complex oxide particle, and then heat treating the resultant at temperatures from 300 deg C. to 1000 deg C. in the oxidizing atmosphere such as air and pure oxygen. As a material of the precursor layer, a material capable of becoming an oxide by firing a hydroxide, a carbonate, a nitrate or the like which contains elements composing the coating layer can be used. Otherwise, as a material of the precursor layer, an oxide composing the coating layer or a plurality of oxides containing elements composing the coating layer can be used. Further, the precursor layer can be adhered by pulverizing and mixing the complex oxide particle and the material of the precursor layer by using, for example, a ball mill, a jet mill, a crusher, or a pulverizing mill. Then, a disperse medium or a solvent such as water may be used. Otherwise, the precursor layer may be adhered by mechanochemical treatment such as mechanochemical fusion, or vapor-phase deposition method such as sputtering method and Chemical Vapor Deposition (CVD) method.

(Second Cathode Active Material)

In a cathode active material according to a second embodiment of the invention, a coating layer is provided on at least part of the complex oxide particle whose average composition is expressed by Chemical formula 2. In the cathode active material, by structuring the average composition of the complex oxide particle as shown in Chemical formula 2, a high capacity and high discharge electric potential can be obtained.

$$Li_{(1+x)}Co_{(1-y)}M_yO_{(2-z)}$$ (Chemical formula 2)

In Chemical formula 2, M represents at least one selected from the group consisting of magnesium, aluminum, boron, titanium, vanadium, chromium, manganese, iron, nickel, copper, zinc, molybdenum, tin, tungsten, zirconium, yttrium, niobium, calcium, and strontium.

A value of x is in the range of $-0.10 \leq x \leq 0.10$, preferably in the range of $-0.08 \leq x \leq 0.08$, and more preferably in the range of $-0.06 \leq x \leq 0.06$. When the value of x is smaller than the foregoing range, the discharging capacity is lowered. Meanwhile, when the value of x is larger than the foregoing range, lithium is diffused in forming the coating layer, and controlling the steps may be difficult.

A value of y is in the range of $0 \leq y \leq 0.50$, preferably in the range of $0 \leq y \leq 0.40$, and more preferably in the range of $0 \leq y \leq 0.30$. That is, M in Chemical formula 2 is not an essential element. Lithium cobaltate is preferable since a high capacity can be obtained and the discharge electric potential is high. Further, M is preferably contained, since the stability can be thereby improved. However, when the amount of M is large, characteristics of lithium cobaltate are lost, and the capacity and the discharge electric potential are lowered.

A value of z is in the range of $-0.10 \leq z \leq 0.20$, preferably in the range of $-0.08 \leq z \leq 0.18$, and more preferably in the range of $-0.06 \leq z \leq 0.16$. In the foregoing range, the discharging capacity can be more improved.

The coating layer functions as a reaction suppression layer. The coating layer is made of an oxide containing lithium, nickel, and manganese. By having such a composition, the capacity is inhibited from being lowered, and the chemical stability can be improved.

In diffraction peaks obtained by CuKα powder X-ray diffraction, the coating layer has a diffraction peak on the lower angle side in the range from 0.2 deg to 1.0 deg than the diffraction angle 2θ of a diffraction peak belonging to face [101] of the complex oxide particle. When the diffraction peak of the coating layer on the lower angle side than the diffraction peak belonging to the face [101] of the complex oxide particle does not fall within the foregoing range and the difference thereof falls within the range smaller than 0.2 deg, dissolution of the complex oxide particle and the coating layer progresses in forming the coating layer, and effects as a reaction suppression layer are lowered. When the difference thereof falls within the range larger than 1.0 deg, contact characteristics of the coating layer are lowered, and favorable coating state may not be obtained. In particular, the diffraction peak of the coating layer preferably exists on the lower angle side in the range from 0.3 deg to 0.55 deg than the diffraction peak belonging to the face [101] of the complex oxide particle. Thereby, higher effects can be obtained.

In X-ray diffraction measurement, Cu—Kα1 (wavelength: 0.15405 nm) is used as an X-ray source. The diffraction angle 2θ of the diffraction peak of the coating layer and the complex oxide particle can be read at a peaktop position derived from Cu—Kα1.

The composition ratio between nickel and manganese in the coating layer at a mol ratio of nickel:manganese is preferably in the range from 90:10 to 30:70, and more preferably in the range from 70:30 to 40:60. When the amount of manganese is larger than the foregoing range, the insertion amount of lithium in the coating layer is lowered, the capacity of the cathode active material is lowered, and the electrical resistance is increased. When the amount of nickel is larger than the foregoing range, the heat stability of the coating layer is lowered, and the high temperature characteristics are lowered. That is, by setting the composition ratio between nickel and manganese to the foregoing range, the stability at high temperatures can be more improved, and the capacity can be more increased.

Further, as an element, at least one selected from the group consisting of magnesium, aluminum, boron, titanium, vanadium, chromium, iron, cobalt, copper, zinc, molybdenum, tin, tungsten, zirconium, yttrium, niobium, calcium, and strontium may be further contained in the oxide of the coating layer. Thereby, the stability of the cathode active material can be more improved, and the diffusion characteristics of lithium ions can be more improved. In this case, the total content of these additional elements to the total content of nickel, manganese, and these additional elements in the coating layer is preferably 40 mol % or less, and more preferably 35 mol % or less. When the content of these additional elements is large, the insertion amount of lithium is lowered, and the capacity of the cathode active material is lowered. These additional elements may be dissolved or may not be dissolved in the oxide.

The amount of the coating layer to the complex oxide particle is preferably in the range from 2 wt % to 30 wt %, and more preferably in the range from 5 wt % to 20 wt %. When the amount of the coating layer is large, the capacity is lowered. Meanwhile, when the amount of the coating layer is small, the stability may not be improved sufficiently. Further, the total content of nickel and manganese in the cathode active material, that is, the total amount of nickel and manganese in the complex oxide particle and the coating layer is preferably 30 mol % or less to the total of metal elements and metalloid elements except for lithium. When the nickel content and the manganese content are large, the capacity is lowered.

The average particle diameter of the cathode active material is preferably in the range from 2.0 μm to 50 μm. When the average particle diameter is less than 2.0 μm, the cathode active material is easily separated from the cathode current collector in the press step in forming the cathode and the surface area of the cathode active material becomes large. In the result, amounts of additives such as an electrical conductor and a binder should be increased, and thereby the energy density per unit weight is decreased. On the contrary, when the average particle diameter is more than 50 μm, the cathode active material passes through the separator, which increases possibility that short circuit is caused.

The method of manufacturing the cathode active material is similar to the method of manufacturing the first cathode active material.

The first or the second cathode active material is used, for example, for the following secondary batteries.

(First Secondary Battery)

Figure 2:
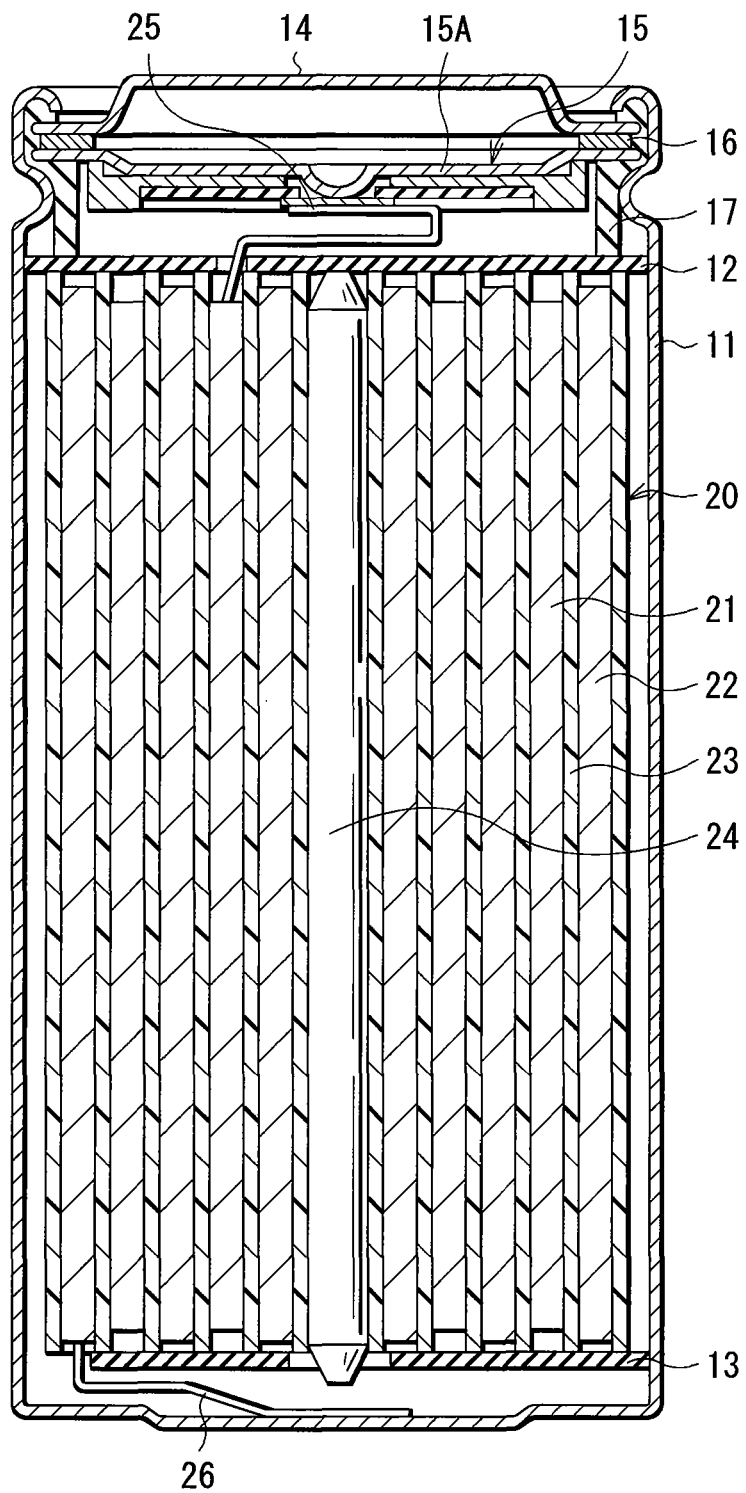
FIG. 2 is a cross section showing a structure of a first secondary battery using the cathode active material according to the embodiment of the invention.

FIG. 2 shows a cross sectional structure of a first secondary battery using the foregoing cathode active material. The secondary battery is a so-called lithium ion secondary battery in which lithium is used as an electrode reactant, and the anode capacity is expressed by the capacity component due to insertion and extraction of lithium. The secondary battery is a so-called cylinder type battery, and has a spirally wound electrode body 20 in which a pair of a strip-shaped cathode 21 and a strip-shaped anode 22 is wound with a separator 23 in between inside a battery can 11 in the shape of an approximately hollow cylinder. An electrolytic solution, which is a liquid electrolyte, is injected inside the battery can 11. The electrolytic solution is impregnated in a separator 3. The battery can 11 is made of, for example, iron plated by nickel. One end of the battery can 11 is closed, and the other end thereof is opened. Inside the battery can 11, a pair of insulating plates 12 and 13 is respectively arranged perpendicular to the spirally wound periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

The spirally wound electrode body 20 is wound centering on a center pin 24, for example. A cathode lead 25 made of aluminum or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 3:
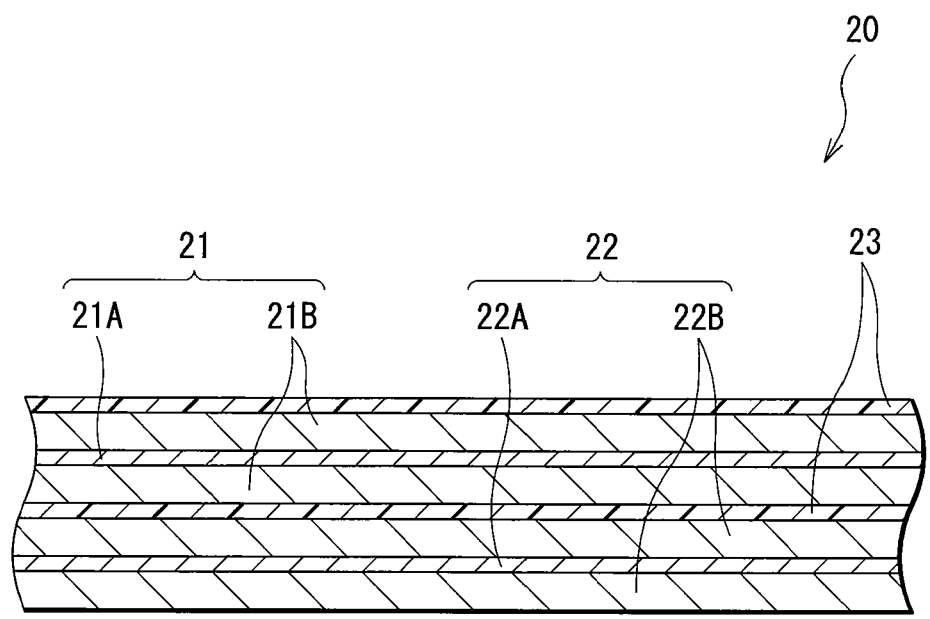
FIG. 3 is an exploded cross section showing part of a spirally wound electrode body in the secondary battery shown in FIG. 2.

FIG. 3 shows an enlarged part of the spirally wound electrode body 20 shown in FIG. 2. The cathode 21 has a structure in which, for example, a cathode active material layer 21B is provided on the both faces of a cathode current collector 21A having a pair of opposed faces. Though not shown, the cathode active material layer 21B may be provided on only one face of the cathode current collector 21A. The cathode current collector 21A is made of a metal foil such as an aluminum foil, a nickel foil, and a stainless foil. The cathode active material layer 21B contains, for example, the particulate cathode active material according to this embodiment and, if necessary, an electrical conductor such as graphite and a binder such as polyvinylidene fluoride. The cathode active material layer 21B may further contain one or more other cathode active materials.

The anode 22 has a structure in which an anode active material layer 22B is provided on the both faces of an anode current collector 22A having a pair of opposed faces. Though not shown, the anode active material layer 22B may be provided only on one face of the anode current collector 22A. The anode current collector 22A is made of, for example, a metal foil such as a copper foil, a nickel foil, and a stainless foil having favorable electrochemical stability, electrical conduction, and mechanical strength.

The anode active material layer 22B contains, as an anode active material, one or more anode materials capable of inserting and extracting lithium. If necessary, the anode active material layer 22B contains a binder similar to that of the cathode active material layer 21B.

In the secondary battery, the charging capacity of the anode material capable of inserting and extracting lithium is larger than the charging capacity of the cathode 21. Therefore, lithium metal is not precipitated on the anode 22 during the charge.

As an anode material capable of inserting and extracting lithium, for example, a carbon material such as non-graphitizable carbon, graphitizable carbon, graphite, pyrolytic carbons, coke, glassy carbons, an organic high molecular weight compound fired body, carbon fiber, and activated carbon can be cited. Of the foregoing, coke includes pitch coke, needle coke, petroleum coke and the like. The organic high molecular weight compound fired body is obtained by firing and carbonizing a high molecular weight material such as a phenol resin and a furan resin at appropriate temperatures, and some thereof are categorized as non-graphitizable carbon or graphitizable carbon. These carbon materials are preferable, since the crystal structure change generated in charge and discharge is very small, a high charge and discharging capacity can be obtained, and favorable cycle characteristics can be obtained. In particular, graphite is preferable, since the electrochemical equivalent is large, and a high energy density can be obtained. Further, non-graphitizable carbon is preferable since superior cycle characteristics can be obtained. Furthermore, a material with low charge and discharge electric potential, specifically a material with charge and discharge electric potential close to that of lithium metal is preferable, since a high energy density of the battery can be thereby easily realized.

As an anode material capable of inserting and extracting lithium, a material which is capable of inserting and extracting lithium, and contains at least one of metal elements and metalloid elements as an element can be also cited. When such a material is used, a high energy density can be obtained. In particular, such a material is more preferably used together with a carbon material, since a high energy density can be obtained, and superior cycle characteristics can be obtained. Such an anode material may be a simple substance, an alloy, or a compound of metal elements or metalloid elements, or may have one or more phases thereof at least in part. In the invention, alloys include an alloy containing one or more metal elements and one or more metalloid elements, in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element composing the anode material, magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium, palladium (Pd), or platinum (Pt) can be cited. They may be crystalline or amorphous.

Specially, as such an anode material, a material containing a metal element or a metalloid element of Group 4B in the short period periodic table as an element is preferable. A material containing at least one of silicon and tin as an element is particularly preferable. Silicon and tin have a high ability to insert and extract lithium, and can provide a high energy density.

As an anode material capable of inserting and extracting lithium, other metal compound or a high molecular weight material can be further cited. As other metal compound, an oxide such as iron oxide, ruthenium oxide, molybdenum oxide, tungsten oxide, titanium oxide, and tin oxide; a sulfide such as nickel sulfide and molybdenum sulfide; or nitride such as lithium nitride can be cited. As a high molecular weight material, polyacetylene, polypyrrole or the like can be cited.

The separator 23 is made of, for example, a porous film made of a synthetic resin such as polytetrafluoroethylene, polypropylene, and polyethylene, or a ceramics porous film. The separator 23 may have a structure in which two or more of the foregoing porous films are layered. Specially, the porous film made of polyolefin is preferable since the short circuit preventive effect is superior, and battery safety can be improved by shutdown effect.

The electrolytic solution contains, for example, a nonaqueous solvent such as an organic solvent and an electrolyte salt dissolved in the nonaqueous solvent. As a nonaqueous solvent, for example, ethylene carbonate, propylene carbonate, diethyl carbonate, dimethyl carbonate, 1,2-dimethoxyethane, 1,2-diethoxyethane, γ-butyrolactone, N-methyl pyrrolidone, acetonitrile, N,N-dimethyl formamide, dimethyl sulfoxide, tetrahydrofuran, 2-methyl tetrahydrofuran, 1,3-dioxolane, 4-methyl-1,3-dioxolane, diethyl ether, sulfolane, methylsulfolane, propionitrile, anisole, ester acetate, ester butyrate, or ester propionate can be cited. One of the nonaqueous solvents may be used singly, or two or more thereof may be used by mixing.

As an electrolyte salt, for example, a lithium salt can be cited. One of lithium salts may be used singly, or two or more thereof may be used by mixing. As a lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, lithium difluoro[oxalato-O,O'] borate, lithium bis oxalate borate, LiBr or the like can be cited.

In the secondary battery, the open circuit voltage in full charge (that is, battery voltage) may be 4.20 V, but is preferably designed to be more than 4.20 V, and to fall within the range from 4.25 V to 4.80 V. By increasing the battery voltage, the energy density can be high. In addition, according to this embodiment, even if the battery voltage is increased, superior cycle characteristics can be obtained since chemical stability of the cathode active material is improved. In this case, the lithium extraction amount per unit weight is larger than in the case that a battery voltage is 4.20 V, even though the same cathode active material is used. Accordingly, the amounts of the cathode active material and the anode active material are adjusted.

The secondary battery can be manufactured, for example, as follows.

First, for example, the cathode 21 is formed by forming the cathode active material layer 21B on the cathode current collector 21A. The cathode active material layer 21B is formed as follows. For example, a cathode active material, an electrical conductor, and a binder are mixed to prepare a cathode mixture. After that, the cathode mixture is dispersed in a solvent such as N-methyl-2-pyrrolidone to obtain paste cathode mixture slurry. The cathode current collector 21A is coated with the cathode mixture slurry, the solvent is dried, and the resultant is compression-molded by a rolling press machine or the like to form the cathode active material layer 21B.

Further, for example, the anode 22 is formed by forming the anode active material layer 22B on the anode current collector 22A. The anode active material layer 22B can be formed by, for example, any of vapor-phase deposition method, liquid-phase deposition method, firing method, and coating, or can be formed by combining two or more of these methods. As a vapor-phase deposition method, for example, physical deposition method or chemical deposition method can be used. Specifically, vacuum vapor deposition method, sputtering method, ion plating method, laser ablation method, thermal CVD (Chemical Vapor Deposition) method, plasma CVD method or the like can be utilized. As a liquid-phase deposition method, a known technique such as electrolytic plating and electroless plating can be utilized. For the firing method, a known technique can be utilized. For example, atmosphere firing method, reactive firing method, or hot press firing method can be utilized. In the case of using coating, the anode active material layer 22B can be formed in the same manner as in the cathode 21.

Subsequently, the cathode lead 25 is attached to the cathode current collector 21A by welding or the like, and the anode lead 26 is attached to the anode current collector 22A by welding or the like. After that, the cathode 21 and the anode 22 are wound with the separator 23 in between. The end of the cathode lead 25 is welded to the safety valve mechanism 15, and the end of the anode lead 26 is welded to the battery can 11. The wound cathode 21 and the wound anode 22 are sandwiched between the pair of insulating plates 12 and 13, and contained inside the battery can 11. After the cathode 21 and the anode 22 are contained inside the battery can 11, an electrolytic solution is injected inside the battery can 11 and impregnated in the separator 23. After that, at the open end of the battery can 11, the battery cover 14, the safety valve mechanism 15, and the PTC device 16 are fixed by being caulked with the gasket 17. The secondary battery shown in FIGS. 2 and 3 is thereby formed.

In the secondary battery, when charged, lithium ions are extracted from the cathode active material layer 21B and inserted in the anode material capable of inserting and extracting lithium contained in the anode active material layer 22B through the electrolytic solution. Next, when discharged, the lithium ions inserted in the anode material capable of inserting and extracting lithium in the anode active material layer 22B are extracted, and inserted in the cathode active material layer 21B through the electrolytic solution. In this embodiment, since the foregoing cathode active material is used, the chemical stability of the cathode 21 is high. Therefore, even if the open circuit voltage in full charge is increased, deteriorative reaction of the cathode 21 and the electrolytic solution is suppressed.

(Second Secondary Battery)

Figure 4:
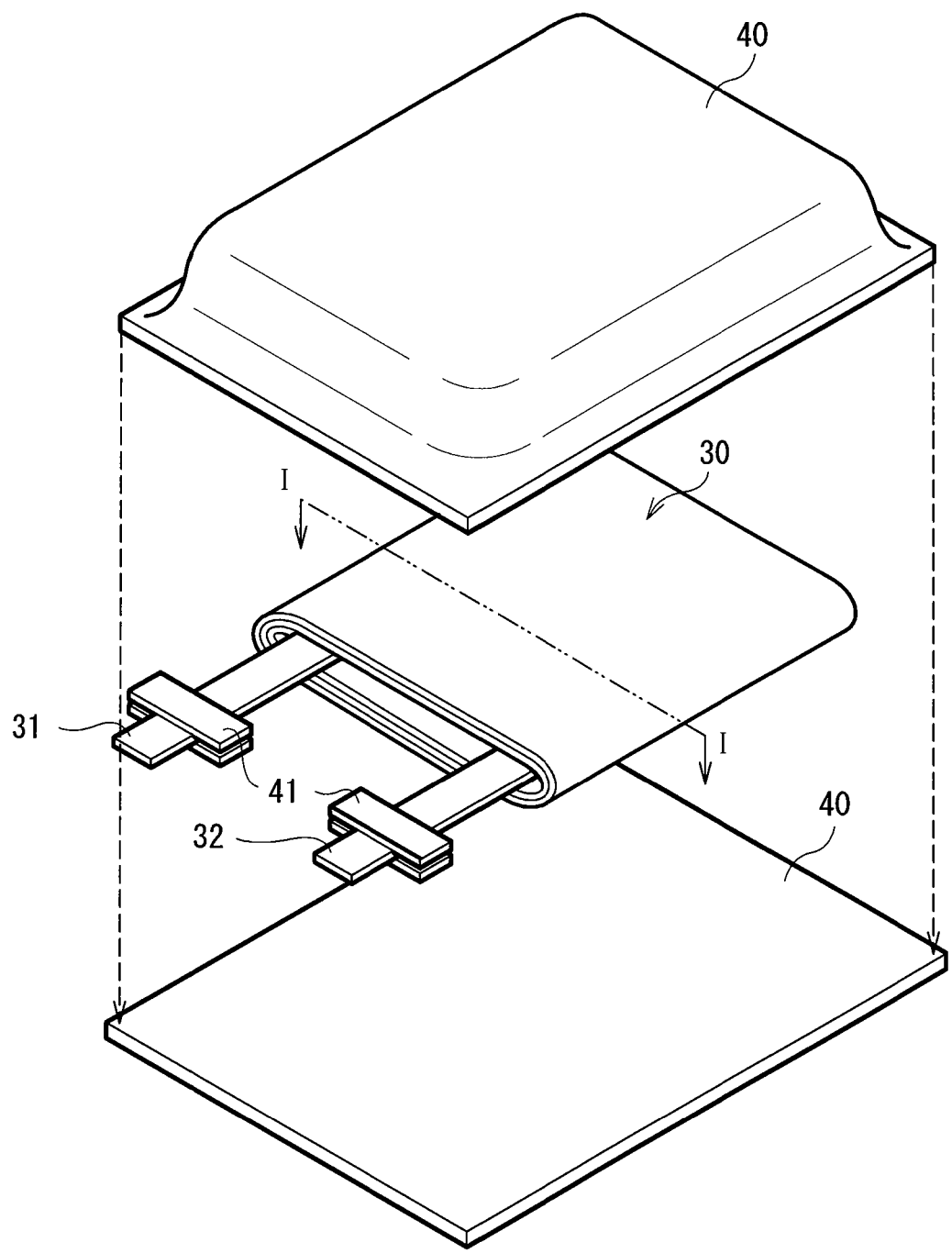
FIG. 4 is an exploded perspective view showing a structure of a second secondary battery using the cathode active material according to the embodiment of the invention.

FIG. 4 shows a structure of a second secondary battery using the foregoing cathode active material. In the secondary battery, a spirally wound electrode body 30 to which a cathode lead 31 and an anode lead 32 are attached is contained inside a film package member 40. Thereby, a small, light, and thin secondary battery can be obtained.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless, and are in a state of thin plate or mesh, respectively.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed. The respective outer edges thereof are contacted to each other by fusion bonding or an adhesive. Adhesive films 41 to protect from outside air intrusion are inserted between the package member 40 and the cathode lead 31, the anode lead 32. The adhesive film 41 is made of a material having contact characteristics to the cathode lead 31 and the anode lead 32, for example, a polyolefin resin such as polyethylene, polypropylene, modified polyethylene, and modified polypropylene.

The package member 40 may be made of a laminated film having other structure, a high molecular weight film such as polypropylene, or a metal film, instead of the foregoing aluminum laminated film.

Figure 5:
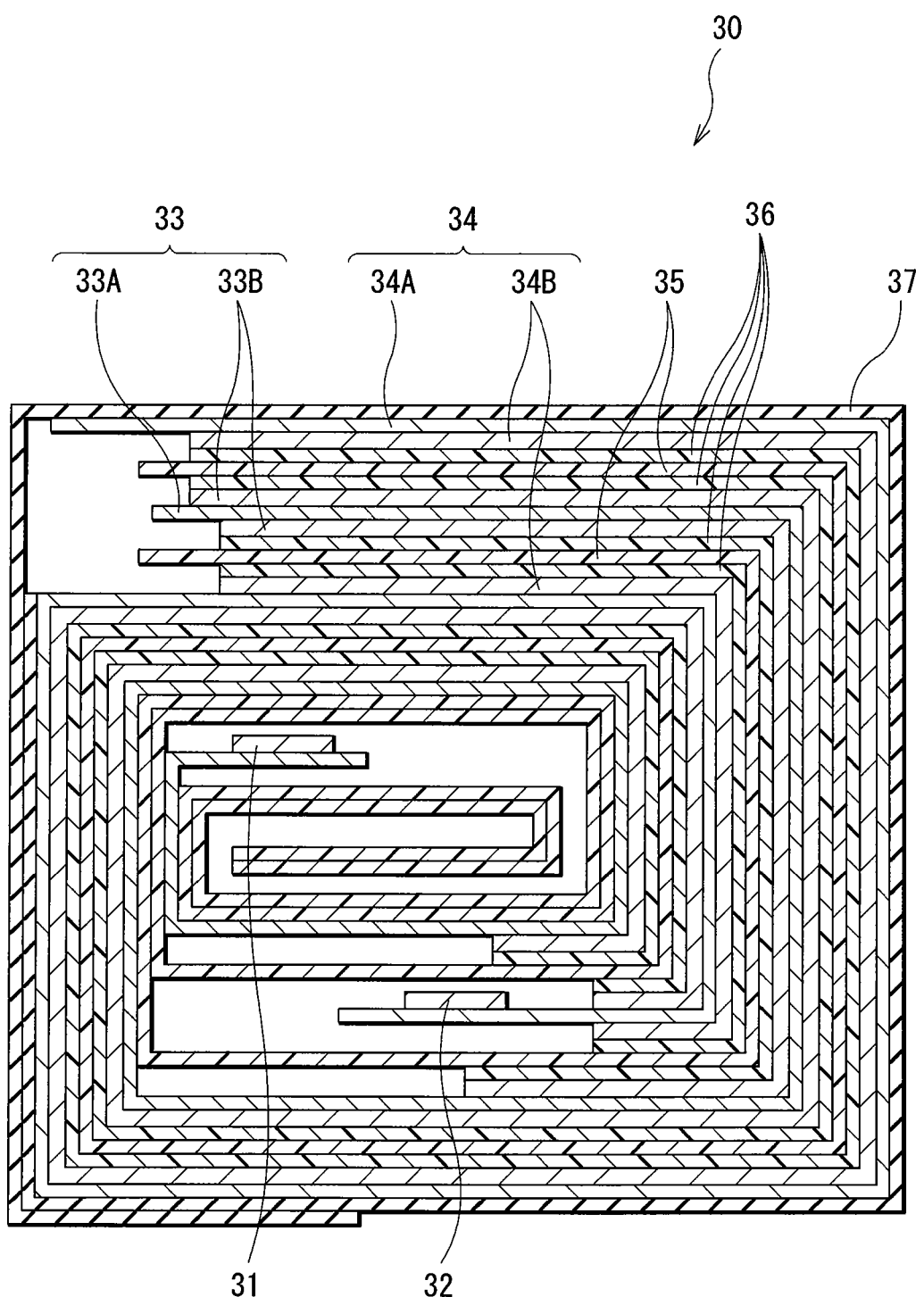
FIG. 5 is a cross section taken along line I-I of a spirally wound electrode body shown in FIG. 4.

FIG. 5 shows a cross sectional structure taken along line I-I of the spirally wound electrode body 30 shown in FIG. 4. In the spirally wound electrode body 30, a cathode 33 and an anode 34 are layered with a separator 35 and an electrolyte layer 36 in between and wound. The outermost periphery thereof is protected by a protective tape 37.

The cathode 33 has a structure in which a cathode active material layer 33B is provided on the both faces of a cathode current collector 33A. The anode 34 has a structure in which an anode active material layer 34B is provided on the both faces of the anode current collector 34A. The structures of the cathode current collector 33A, the cathode active material layer 33B, the anode current collector 34A, the anode active material layer 34B, and the separator 35 are respectively similar to that of the cathode current collector 21A, the cathode active material layer 21B, the anode current collector 22A, the anode active material layer 22B, and the separator 23 described above.

The electrolyte layer 36 is made of a so-called gelatinous electrolyte containing an electrolytic solution and a high molecular weight compound which becomes a holding body to hold the electrolytic solution. The gelatinous electrolyte layer 36 is preferable, since a high ion conductivity can be thereby obtained, and liquid leakage can be thereby prevented. The structure of the electrolytic solution is similar to that of the first secondary battery. As a high molecular weight compound, for example, polyacrylonitrile, polyvinylidene fluoride, a copolymer of vinylidene fluoride and hexafluoro propylene, polytetrafluoroethylene, polyhexafluoropropylene, polyethylene oxide, polypropylene oxide, polyphosphazene, polysiloxane, polyvinyl acetate, polyvinyl alcohol, polymethacrylic methyl, polyacrylic acid, polymethacrylic acid, styrene-butadiene rubber, nitrile-butadiene rubber, polystyrene, polycarbonate or the like can be cited. In particular, in view of electrochemical stability, polyacrylonitrile, polyvinylidene fluoride, polyhexafluoro propylene, or polyethylene oxide is preferable.

The secondary battery can be manufactured, for example, as follows.

First, the cathode 33 and the anode 34 are manufactured in the same manner as in the first secondary battery. After that, the cathode 33 and the anode 34 are respectively coated with a precursor solution containing an electrolytic solution, a high molecular weight compound, and a mixed solvent. The mixed solvent is volatilized to form the electrolyte layer 36. After that, the cathode lead 31 is attached to the cathode current collector 33A, and the anode lead 32 is attached to the anode current collector 34A. Next, the cathode 33 and the anode 34 formed with the electrolyte layer 36 are layered with the separator 35 in between to obtain a lamination. The lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery shown in FIGS. 4 and 5 is completed.

Otherwise, the secondary battery may be fabricated as follows. First, as described above, the cathode 33 and the anode 34 are formed, and the cathode lead 31 and the anode lead 32 are attached to the cathode 33 and the anode 34. After that, the cathode 33 and the anode 34 are layered with the separator 35 in between and wound. The protective tape 37 is adhered to the outermost periphery thereof, and a spirally wound body, which is a precursor of the spirally wound electrode body 30, is formed. Next, the spirally wound body is sandwiched between the package members 40, the outermost peripheries except for one side are thermally fusion-bonded to obtain a pouched state, and the spirally wound body is contained inside the package member 40. Subsequently, an electrolytic composition containing an electrolytic solution, a monomer which is a raw material of the high molecular weight compound, a polymerization initiator, and if necessary other material such as a polymerization inhibitor is injected inside the package member 40, and the opening of the package member 40 is hermetically sealed. After that, the resultant is heated to polymerize the monomer to obtain a high molecular weight compound. Thereby, the gelatinous electrolyte layer 36 is formed, and the secondary battery shown in FIGS. 4 and 5 is assembled.

The secondary battery operates similarly to the first secondary battery.

According to the embodiment of the invention described above, the cathode active material in which the coating layer is provided on the complex oxide particle whose average composition is expressed by $Li_{(1+w)}Co_{(1-x-y)}M1_xM2_yO_{(2-z)}$ is used. Thereby, even if breakage or destruction is caused by external force, activity of the surface thereby exposed can be low.

Further, according to the embodiment of the invention described above, the cathode active material in which the coating layer composed of an oxide containing lithium, nickel, and manganese in which manganese concentration of the external layer portion is higher than of the internal layer portion is provided on the complex oxide particle whose average composition is expressed by $Li_{(1+x)}Co_{(1-y)}M_yO_{(2-z)}$ is used. Thereby, while characteristics that the complex oxide particle has a high capacity and high electric potential are maintained, the chemical stability of the cathode active material can be improved.

Further, according to the embodiment of the invention described above, the cathode active material in which the coating layer which contains lithium, nickel, and manganese and has a diffraction peak on the lower angle side in the range from 0.2 deg to 1.0 deg than the diffraction angle 2θ of a diffraction peak belonging to the face [101] of the complex oxide particle is provided on the complex oxide particle whose average composition is expressed by $Li_{(1+x)}Co_{(1-y)}M_yO_{(2-z)}$ is used. Therefore, while characteristics that the complex oxide particle has a high capacity and high electric potential are maintained, the chemical stability of the cathode active material can be improved.

Therefore, according to the battery of the embodiment of the invention using these cathode active materials, a high capacity and high potential can be obtained, in addition, the high temperature characteristics or cycle characteristics can be improved, and the chemical stability can be improved.

Further, after the internal precursor layer of the hydroxide containing nickel and manganese is formed in the aqueous solution with the hydrogen-ion exponent pH of 12 or more, the valence of manganese ions is changed, and then the external precursor layer of the hydroxide in which the manganese concentration is higher than that of the internal precursor layer is formed. Therefore, the cathode active material according to this embodiment can be easily formed.

EXAMPLES

Further, specific examples of the invention will be hereinafter described in detail.

Examples 1-1 and 1-2

A cathode active material was formed as follows. First, 38.1 parts by weight of lithium carbonate ($Li_2CO_3$), 113.0 parts by weight of cobalt carbonate ($CoCO_3$), 23.4 parts by weight of aluminum hydroxide ($Al(OH)_3$), and 16.9 parts by weight of magnesium carbonate ($MgCO_3$) were mixed while being pulverized by a ball mill. After the resultant was calcined for 5 hours at 650 deg C. in the air, the resultant was fired for 20 hours at 950 deg C. in the air, and complex oxide particle was formed. The average composition of the formed complex oxide particle was examined by ICP spectrometry. The result was $Li_{1.03}Co_{0.95}Al_{0.03}Mg_{0.02}O_{2.02}$. Next, the complex oxide particle was pulverized, and the particle size was adjusted. The average particle diameter measured by laser scattering method was 11 μm.

Next, 20 parts by weight of the complex oxide particle was stirred and dispersed for 2 hours in 300 parts by weight of a lithium hydroxide aqueous solution of 2 N at 80 deg C. Subsequently, 1.60 parts by weight of nickel nitrate ($Ni(NO_3)_2 \cdot 6H_2O$) and 1.65 parts by weight of manganese nitrate ($Mn(NO_3)_2 \cdot 6H_2O$) were mixed. Pure water was added to the resultant to obtain 10 parts by weight of an aqueous solution. The whole 10 parts by weight of the aqueous solution was added to the lithium hydroxide aqueous solution dispersed with the complex oxide particle in 30 minutes. The hydrogen-ion exponent pH of the lithium hydroxide aqueous solution after being added with the aqueous solution of nickel nitrate and manganese nitrate was 14.2. Further, the resultant was stirred and dispersed for 3 hours at 80 deg C. to precipitate a hydroxide containing nickel and manganese on the surface of the complex oxide particle. After the resultant was cooled, the resultant was filtered and dried at 120 deg C.

After that, the complex oxide particle formed with the precursor layer was heated at a speed of 5 deg C./min by using an electrical furnace, maintained for 5 hours at 950 deg C., and then cooled down to 150 deg C. at a speed of 7 deg C./min. Thereby, a coating layer was formed and a cathode active material was obtained. For the obtained cathode active material, the concentration change of nickel and manganese was examined. The nickel content and manganese content were sharply decreased down to approximate zero from the surface to the inside. That is, it was confirmed that the coating layer containing nickel and manganese was formed on the surface of the complex oxide particle.

Next, the secondary battery shown in FIGS. 2 and 3 was fabricated by using the cathode active material. First, 86 wt % of the formed cathode active material powder, 10 wt % of graphite as an electrical conductor, and 4 wt % of polyvinylidene fluoride as a binder were mixed, dispersed in N-methyl-2-pyrrolidone as a solvent. After that, the both faces of the cathode current collector 21A made of a strip-shaped aluminum foil being 20 μm thick was coated with the resultant, which was dried and compression-molded by a rolling press machine to form the cathode active material layer 21B and thereby forming the cathode 21. Then, in Example 1-1, the compression molding by the rolling press machine was performed once. In Example 1-2, the compression molding under the same conditions as of Example 1-1 was performed three times. Next, the cathode lead 25 made of aluminum was attached to the cathode current collector 21A.

Further, 90 wt % of artificial graphite powder as an anode active material and 10 wt % of polyvinylidene fluoride as a binder were mixed, and dispersed in N-methyl-2-pyrrolidone as a solvent. After that, the both faces of the anode current collector 22A made of a strip-shaped copper foil being 10 μm thick were coated with the resultant, which was dried and compression-molded by a rolling press machine to form the anode active material layer 22B and thereby forming the anode 22. Next, the anode lead 26 made of nickel was attached to the anode current collector 22A. Then, design was made so that the amounts of the cathode active material and the anode active material were adjusted, the open circuit voltage in full charge was 4.40 V, and the capacity of the anode 22 was expressed by a capacity component due to insertion and extraction of lithium.

Next, the formed cathode 21 and the formed anode 22 were wound a plurality of times with the separator 23 made of a porous polyolefin film in between to form the spirally wound electrode body 20. Subsequently, the spirally wound electrode body 20 was sandwiched between the pair of insulating plates 12 and 13, the anode lead 26 was welded to the battery can 11, the cathode lead 25 was welded to the safety valve mechanism 15, and the resultant was contained inside the battery can 11. After that, an electrolytic solution was injected inside the battery can 11, and the battery can 11 was caulked with the gasket 17. Thereby, the safety valve mechanism 15, the PCT device 16, and the battery cover 14 were fixed to obtain a cylinder type secondary battery being 18 mm in outer diameter and 65 mm in height. For the electrolytic solution, a solution in which $LiPF_6$ was dissolved as an electrolyte salt in a mixed solvent of ethylene carbonate and diethyl carbonate at a volume ratio of 1:1 so that the concentration of $LiPF_6$ became 1.0 mol/l was used.

Further, as Comparative examples 1-1 and 1-2 relative to Examples 1-1 and 1-2, a cathode active material and secondary batteries were fabricated in the same manner as in Examples 1-1 and 1-2, except that complex oxide particle whose average composition was $Li_{1.03}CoO_{2.02}$ were used. The complex oxide particle was formed by mixing 38.1 parts by weight of lithium carbonate and 118.9 parts by weight of cobalt carbonate, calcining the resultant for 5 hours at 650 deg C. in the air, and then firing the resultant for 20 hours at 950 deg C. in the air. Further, when the cathode was formed, in Comparative example 1-1, compression molding by a rolling press machine was performed once similarly to in Example 1-1, and in Comparative example 1-2, compression molding by the rolling press machine was performed three times similarly to in Example 1-2.

For the fabricated secondary batteries of Examples 1-1 and 1-2 and Comparative examples 1-1 and 1-2, charge and discharge were performed at 45 deg C., and the discharging capacity at the first cycle was obtained as an initial capacity, and the discharge capacity retention ratio at the 200th cycle to the first cycle was examined. For the charge, constant current charge was performed at a constant current of 1000 mA until the battery voltage reached 4.40 V, and then constant voltage charge was performed at a constant voltage of 4.40 V until the total charging time became 2.5 hours. For the discharge, constant current discharge at a constant current of 800 mA was performed until the battery voltage reached 2.75 V. The obtained results are shown in Table 1.

TABLE 1

| | Complex oxide particle | No. of times of cathode compression molding | Initial capacity (mAh) | Discharge capacity retention ratio (%) |
|---|---|---|---|---|
| Example 1-1 | $Li_{1.03}Co_{0.95}Al_{0.03}Mg_{0.02}O_{2.02}$ | 1 | 2400 | 88 |
| Example 1-2 | | 3 | 2400 | 84 |
| Comparative example 1-1 | $Li_{1.03}CoO_{2.02}$ | 1 | 2480 | 80 |
| Comparative example 1-2 | | 3 | 2470 | 75 |

As shown in Table 1, according to Examples 1-1 and 1-2, the initial capacity was decreased slightly compared to in Comparative examples 1-1 and 1-2 using lithium cobaltate for the complex oxide particle. However, according to Examples 1-1 and 1-2, the discharge capacity retention ratio could be improved. In particular, when the compressibility coefficient was increased, in Comparative examples 1-1 and 1-2, the discharge capacity retention ratio was decreased by 6.3%, and the initial capacity was also decreased. However, in Examples 1-1 and 1-2, even when the compressibility coefficient was increased, the decrease ratio of the discharge capacity retention ratio was 4.5%, which was smaller than of Comparative example 1-2, and the initial capacity was not decreased.

That is, it was found that when the complex oxide particle containing other elements such as aluminum and magnesium in addition to cobalt was used, even if external force was applied, high chemical stability could be obtained, and cycle characteristics could be improved.

Examples 2-1 to 2-4

Cathode active materials and secondary batteries were fabricated in the same manner as in Examples 1-1, except that the average composition of the complex oxide particle was changed. In Example 2-1, complex oxide particle was formed in the same manner as in Example 1-1, except that 38.1 parts by weight of lithium carbonate, 116.5 parts by weight of cobalt carbonate, 7.8 parts by weight of aluminum hydroxide, and 8.4 parts by weight of magnesium carbonate were mixed. When the average composition thereof was examined in the same manner as in Example 1-1, the result was $Li_{1.03}Co_{0.98}Al_{0.01}Mg_{0.01}O_{2.02}$.

In Example 2-2, complex oxide particle was formed in the same manner as in Example 1-1, except that 38.1 parts by weight of lithium carbonate and 116.5 parts by weight of cobalt carbonate were mixed, and the resultant was added and mixed with a solution obtained by dissolving 45.6 parts by weight of titanium ethoxide $((C_2H_5O_4Ti)$ in anhydrous ethyl alcohol. When the average composition thereof was examined in the same manner as in Example 1-1, the result was $Li_{1.03}Co_{0.98}Ti_{0.02}O_{2.02}$.

In Example 2-3, complex oxide particle was formed in the same manner as in Example 1-1, except that 38.1 parts by weight of lithium carbonate and 116.5 parts by weight of cobalt carbonate were mixed, and the resultant was added and mixed with a solution obtained by dissolving 54.3 parts by weight of zirconium ethoxide $((C_2H_5O_4Zr)$ in anhydrous ethyl alcohol. When the average composition thereof was examined in the same manner as in Example 1-1, the result was $Li_{1.03}Co_{0.98}Zr_{0.02}O_{2.02}$.

In Example 2-4, complex oxide particle was formed in the same manner as in Example 1-1, except that 38.1 parts by weight of lithium carbonate, 117.7 parts by weight of cobalt carbonate, and 7.8 parts by weight of aluminum hydroxide were mixed. When the average composition thereof was examined in the same manner as in Example 1-1, the result was $Li_{1.03}Co_{0.99}Al_{0.01}O_{2.02}$.

For the fabricated secondary batteries of Examples 2-1 to 2-4, the initial capacity and the discharge capacity retention ratio were obtained in the same manner as in Example 1-1. The obtained results are shown in Table 2 with the results of Example 1-1 and Comparative example 1-1.

TABLE 2

| | Complex oxide particle | Initial capacity (mAh) | Discharge capacity retention ratio (%) |
|---|---|---|---|
| Example 1-1 | $Li_{1.03}Co_{0.95}Al_{0.03}Mg_{0.02}O_{2.02}$ | 2400 | 88 |
| Example 2-1 | $Li_{1.03}Co_{0.98}Al_{0.01}Mg_{0.01}O_{2.02}$ | 2460 | 86 |
| Example 2-2 | $Li_{1.03}Co_{0.98}Ti_{0.02}O_{2.02}$ | 2410 | 84 |
| Example 2-3 | $Li_{1.03}Co_{0.98}Zr_{0.02}O_{2.02}$ | 2400 | 83 |
| Example 2-4 | $Li_{1.03}Co_{0.99}Al_{0.01}O_{2.02}$ | 2460 | 83 |
| Comparative example 1-1 | $Li_{1.03}CoO_{2.02}$ | 2480 | 80 |

As evidenced by Table 2, according to Examples 2-1 to 2-4, the discharge capacity retention ratio could be improved similarly to in Example 1-1, compared to in Comparative example 1-1. That is, it was found that when the complex oxide particle containing at least one selected from the group consisting of magnesium, aluminum, titanium, and zirconium in addition to cobalt was used, even if external force was applied, high chemical stability could be obtained, and the cycle characteristics could be improved.

Examples 3-1 to 3-3

Cathode active materials and secondary batteries were fabricated in the same manner as in Example 2-1, except that the method of forming the coating layer was changed. In Example 3-1, a cathode active material was formed in the same manner as in Example 2-1, except that 3.20 parts by weight of nickel nitrate and 3.30 parts by weight of manganese nitrate were mixed, the resultant was added with pure water to obtain 20 parts by weight of an aqueous solution, and the whole 20 parts by weight of the aqueous solution was added to a lithium hydroxide aqueous solution in which complex oxide particle was dispersed in one hour. That is, the addition amounts of nickel nitrate and manganese nitrate were twice of Example 2-1.

In Example 3-2, a cathode active material was formed in the same manner as in Example 2-1, except that 0.86 parts by weight of aluminum nitrate $(Al(NO_3)_3 \cdot 9H_2O)$ of a commercially available reagent was added to 3.20 parts by weight of nickel nitrate and 3.30 parts by weight of manganese nitrate, pure water was further added to the resultant to obtain 20 parts by weight of an aqueous solution, and the whole 20 parts by weight of the aqueous solution was added to a lithium hydroxide aqueous solution in which complex oxide particle was dispersed in one hour. That is, a precursor layer was formed by adding aluminum nitrate in addition to nickel nitrate and manganese nitrate.

In Example 3-3, first, 20 parts by weight of the complex oxide particle identical to of Example 2-1 was stirred and dispersed for 1 hour in 300 parts by weight of pure water at 80 deg C, which was added with 1.60 parts by weight of nickel nitrate and 1.65 parts by weight of manganese nitrate. Next, the foregoing resultant was added with a lithium hydroxide aqueous solution of 2 N in 30 minutes until the hydrogen-ion exponent pH became 13. The resultant was further stirred and dispersed at 80 deg C. for 3 hours to precipitate a hydroxide containing nickel and manganese on the surface of the complex oxide particle. After the resultant was cooled, the resultant was filtered and dried at 120 deg C. Subsequently, 2 parts by weight of a lithium hydroxide aqueous solution of 2 N was impregnated in 10 parts by weight of the complex oxide particle formed with the precursor layer in order to adjust the amount of lithium. After the resultant was uniformly mixed and dried, heat treatment similar to that of Example 2-1 was performed to form a coating layer.

In Examples 2-1 and 3-1 to 3-3, for the complex oxide particle formed with the precursor layer, the mol ratio of metal elements, Li:Co:Ni:Mn:Al:Mg was analyzed. In Example 2-1, the result was 1.04:0.94:0.02:0.02:0.01:0.01. In Example 3-1, the result was 1.03:0.88:0.05:0.05:0.01:0.01. In Example 3-2, the result was 1.03:0.88:0.05:0.05:0.02:0.01. In Example 3-3, the result was 1.00:0.94:0.02:0.02:0.01:0.01.

For the fabricated secondary batteries of Examples 3-1 to 3-3, the initial capacity and the discharge capacity retention ratio were obtained in the same manner as in Example 2-1. The obtained results are shown in Table 3 together with the results of Example 2-1 and Comparative example 1-1.

TABLE 3

| | Complex oxide particle | Metal element ratio after forming precursor layer Li:Co:Ni:Mn:Al:Mg | Initial capacity (mAh) | Discharge capacity retention ratio (%) |
|---|---|---|---|---|
| Example 2-1 | $Li_{1.03}Co_{0.98}Al_{0.01}Mg_{0.01}O_{2.02}$ | 1.04:0.94:0.02:0.02:0.01:0.01 | 2460 | 86 |
| Example 3-1 | | 1.03:0.88:0.05:0.05:0.01:0.01 | 2420 | 87 |
| Example 3-2 | | 1.03:0.88:0.05:0.05:0.02:0.01 | 2400 | 89 |
| Example 3-3 | | 1.00:0.94:0.02:0.02:0.01:0.01 | 2440 | 81 |
| Comparative example 1-1 | $Li_{1.03}CoO_{2.02}$ | — | 2480 | 80 |

As evidenced by Table 3, according to Examples 3-1 to 3-3, the discharge capacity retention ratio could be improved compared to in Comparative example 1-1 similarly to in Example 2-1. Further, as evidenced by comparison between Example 2-1 and Example 3-1, according to Example 3-1 with larger amount of the coating layer, the discharge capacity retention ratio could be more improved though the initial capacity was decreased. Further, as evidenced by comparison between Example 3-1 and Example 3-2, according to Example 3-2 forming the coating layer from the oxide containing aluminum in addition to lithium, nickel, and magnesium, the discharge capacity retention ratio could be more improved though the initial capacity was decreased. That is, it was found that when the amount of the coating layer was larger, or when the coating layer was formed from the oxide further containing other element such as aluminum, the chemical stability of the cathode active material could be more improved.

In addition, as evidenced by comparison between Example 2-1 and Example 3-3, according to Comparative example 2-1 in which the complex oxide particle was dispersed in the aqueous solution with adjusted hydrogen-ion exponent pH and the raw material of the precursor layer was added thereto, higher values were obtained for both the initial capacity and the discharge capacity retention ratio than in Example 3-3 in which after the complex oxide particle was dispersed in the aqueous solution dissolved with the raw material of the precursor layer, the hydrogen-ion exponent pH was adjusted. That is, it was found that when the raw material of the precursor layer was added after the complex oxide particle was dispersed in the aqueous solution with the hydrogen-ion exponent pH of 12 or more, the chemical stability of the cathode active material could be more improved.

Example 4-1

First, 20 parts by weight of complex oxide particle with the average composition of $Li_{1.03}Co_{0.98}Al_{0.01}Mg_{0.01}O_{2.02}$ and the average particle diameter measured by laser scattering method of 13 μm was stirred for 2 hours and dispersed in 300 parts by weight of lithium hydroxide aqueous solution of 2 N at 80 deg C (hydrogen-ion exponent pH is 14.3) while nitrogen gas was circulated (step S111, refer to FIG. 1). Next, 1.60 parts by weight of nickel nitrate ($Ni(NO_3)_2 \cdot 6H_2O$) of a commercially available reagent and 1.65 parts by weight of manganese nitrate ($Mn((NO_3)_2 \cdot 6H_2O$) of a commercially available reagent were mixed, pure water was added to the resultant to obtain 10 parts by weight of an aqueous solution, and the whole 10 parts by weight of the aqueous solution was added to the lithium hydroxide aqueous solution in which the complex oxide particle was dispersed in 30 minutes while nitrogen gas was circulated. Thereby, an internal precursor layer of a hydroxide containing nickel and manganese was formed on the surface of the complex oxide particle (step S112, refer to FIG. 1). The hydrogen-ion exponent pH of the lithium hydroxide aqueous solution after the aqueous solution of nickel nitrate and manganese nitrate was added was 14.2.

Subsequently, while air instead of nitrogen gas was circulated in the aqueous solution, stirring and dispersing were continued for 3 hours at 80 deg C. Thereby, an external precursor layer of a hydroxide containing nickel and manganese was formed on the surface of the complex oxide particle, which was cooled (step S102, refer to FIG. 1). After that, the resultant was filtered, and dried at 120 deg C. without being washed. For the complex oxide particle formed with the internal precursor layer and the external precursor layer thereby obtained, the mol ratio of metal elements was analyzed. The result was Li:Co:Ni:Mn:Al:Mg=1.04:0.94:0.02:0.02:0.01: 0.01.

Next, the complex oxide particle formed with the internal precursor layer and the external precursor layer was heated at a speed of 5 deg C./min by using an electric furnace, retained for 5 hours at 950 deg C., and then cooled down to 150 deg C. at a speed of 7 deg C./min. Thereby, a coating layer was formed, and a cathode active material was obtained (step S103, refer to FIG. 1).

Example 4-2

A cathode active material was formed in the same conditions as in Examples 1-1 and 1-2, except that 3.20 parts by weight of nickel nitrate and 3.30 parts by weight of manganese nitrate were mixed, pure water was added to the resultant to obtain 20 parts by weight of an aqueous solution, and the whole 20 parts by weight of the aqueous solution was added to a lithium hydroxide aqueous solution in which complex oxide particle was dispersed in 1 hour while nitrogen gas was circulated. That is, the addition amounts of nickel nitrate and manganese nitrate were twice of Examples 1-1 and 1-2. The hydrogen-ion exponent pH of the lithium hydroxide aqueous solution after the aqueous solution of nickel nitrate and manganese nitrate was added was 14.2. For the complex oxide particle formed with the internal precursor layer and the external precursor layer, the mol ratio of metal elements was analyzed. The result was Li:Co:Ni:Mn:Al:Mg=1.03:0.88: 0.05:0.05:0.01:0.01.

Example 4-3

A cathode active material was formed in the same conditions as in Examples 1-1 and 1-2, except that 0.86 parts by weight of aluminum nitrate (Al((NO$_3$)$_3$·9H$_2$O) of a commercially available reagent was added to 3.20 parts by weight of nickel nitrate and 3.30 parts by weight of manganese nitrate, pure water was further added to the resultant to obtain 20 parts by weight of an aqueous solution, and the whole 20 parts by weight of the aqueous solution was added to a lithium hydroxide aqueous solution in which complex oxide particle was dispersed in 1 hour while nitrogen gas was circulated. That is, an internal precursor layer and an external precursor layer were formed by adding aluminum nitrate in addition to nickel nitrate and manganese nitrate. For the complex oxide particle formed with the internal precursor layer and the external precursor layer, the mol ratio of metal elements was analyzed. The result was Li:Co:Ni:Mn:Al:Mg=1.03:0.88:0.05:0.05: 0.02:0.01.

Comparative Example 4-1

The complex oxide particle of the same lot as of Examples 4-1 to 4-3 was used directly as a cathode active material.

Comparative Examples 4-2 to 4-4

Cathode active materials were formed in the same conditions as in Examples 1-1 to 3-3, except that a hydroxide was precipitated on complex oxide particle without circulating nitrogen gas and air in an aqueous solution. For the complex oxide particle precipitated with the hydroxide, the mol ratio of metal elements (Li:Co:Ni:Mn:Al:Mg) was analyzed. In Comparative example 4-2, the result was Li:Co:Ni:Mn:Al: Mg=1.04:0.94:0.02:0.02:0.01:0.01. In Comparative example 4-3, the result was Li:Co:Ni:Mn:Al:Mg=1.03:0.88:0.05: 0.05:0.01:0.01. In Comparative example 4-4, the result was Li:Co:Ni:Mn:Al:Mg=1.03:0.88:0.05:0.05:0.02:0.01.

For the formed cathode active materials of Examples 4-1 to 4-3 and Comparative examples 4-2 to 4-4, the distribution state of the metal elements on the surface was examined by XPS (X-ray photoelectron Spectroscopy). In the result, it was confirmed that the concentration of manganese on the surface in Examples 4-1 to 4-3 was higher than in Comparative examples 4-2 to 4-4.

Next, the secondary batteries shown in FIGS. 2 and 3 were fabricated in the same manner as in Example 1-1 by using the formed cathode active materials of Examples 4-1 to 4-3 and Comparative examples 4-1 to 4-4.

For the fabricated secondary batteries, charge and discharge were performed at 45 deg C., and the discharging capacity at the first cycle was obtained as an initial capacity, and the discharging capacity retention ratio at the 200th cycle to the first cycle was examined. For the charge, constant current charge was performed at a constant current of 1000 mA until the battery voltage reached 4.40 V, and then constant voltage charge was performed at a constant voltage of 4.40 V until the total charging time became 2.5 hours. For the discharge, constant current discharge at a constant current of 800 mA was performed until the battery voltage reached 2.75 V. The obtained results are shown in Table 4.

TABLE 4

| | External precursor layer | Metal element ratio after forming internal precursor layer and external precursor layer Li:Co:Ni:Mn:Al:Mg | Initial capacity (mAh) | Discharge capacity retention ratio (%) |
|---|---|---|---|---|
| Example 4-1 | Formed | 1.04:0.94:0.02:0.02:0.01:0.01 | 2460 | 87 |
| Example 4-2 | | 1.03:0.88:0.05:0.05:0.01:0.01 | 2430 | 88 |
| Example 4-3 | | 1.03:0.88:0.05:0.05:0.02:0.01 | 2410 | 90 |
| Comparative example 4-1 | — | — | 2200 | 35 |
| Comparative example 4-2 | Not formed | 1.04:0.94:0.02:0.02:0.01:0.01 | 2460 | 86 |
| Comparative example 4-3 | | 1.03:0.88:0.05:0.05:0.01:0.01 | 2420 | 87 |
| Comparative example 4-4 | | 1.03:0.88:0.05:0.05:0.02:0.01 | 2400 | 89 |

As evidenced by Table 4, according to Examples 4-1 to 4-3, the initial capacity and the discharge capacity retention ratio could be significantly improved compared to in Comparative example 4-1 not formed with the coating layer. Further, according to Examples 4-1 to 4-3, the discharge capacity retention ratio could be further improved than in Comparative examples 4-2 to 4-4 not formed with the external precursor layer. That is, it was found that when the concentration of manganese in the external portion of the coating layer was larger than in the internal portion thereof, the chemical stability of the cathode active material could be more improved, and the capacity and the cycle characteristics could be improved.

Examples 5-1 to 5-9

Cathode active materials were formed as follows. In Example 5-1, first, as complex oxide particle, lithium cobaltate powder with the average composition of $Li_{1.03}CoO_2$ and the average particle diameter measured by laser scattering method of 13 μm were prepared, and as a raw material of the coating layer, precursor powder obtained by mixing lithium carbonate ($Li_2CO_3$) powder, nickel hydroxide ($Ni(OH)_2$) powder, and manganese carbonate ($MnCO_3$) powder at a mol ratio of $Li_2CO_3:Ni(OH)_2:MnCO_3=1.08:1:1$ were prepared. Next, the precursor powder was added to 100 parts by weight of the lithium cobaltate powder so that 10 parts by weight when converted to $Li_{1.08}N_{10.5}Mn_{0.5}O_2$ was obtained. The resultant was stirred and dispersed for 1 hour by using 100 parts by weight of pure water at 25 deg C. After that, the resultant was depressurized and dried at 70 deg C., and a precursor layer was formed on the surface of the complex oxide particle. Subsequently, the resultant was heated at a speed of 3 deg C./min, retained for 3 hours at 800 deg C., and then cooled. Thereby, a coating layer was formed and a cathode active material was obtained.

In Example 5-2, a cathode active material was formed in the same manner as in Example 5-1, except that precursor powder similar to of Example 5-1 were pulverized by a ball mill until the average particle diameter became 1 μm or less, and the resultant was mixed with complex oxide particle.

In Example 5-3, a cathode active material was formed as follows. Precursor powder similar to of Example 1-1 which were pulverized until the average particle diameter became 1 μm or less were added to 100 parts by weight of complex oxide particle similar to of Example 5-1 so that 10 parts by weight when converted to $Li_{1.08}Ni_{0.5}Mn_{0.5}O_2$ was obtained. The resultant was treated by a mechanofusion apparatus to form a precursor layer. After that, heat treatment similar to of Example 5-1 was performed, and thereby a coating layer was formed. In the result, the cathode active material was formed.

In Example 5-4, a cathode active material was formed in the same manner as in Example 5-1, except that the heat treatment temperature was 750 deg C.

In Example 5-5, a cathode active material was formed in the same manner as in Example 5-1, except that the rate of temperature increase in heat treatment was 10 deg C./min, and the retention time at 800 deg C. was 2 hours.

In Example 5-6, a cathode active material was formed in the same manner as in Example 5-1, except that as complex oxide particle, complex oxide powder with the average composition of $Li_{1.03}Co_{0.98}Al_{0.01}Mg_{0.01}O_2$ were used, precursor powder similar to of Example 5-1 were pulverized by a ball mill until the average particle diameter became 1 μm or less, and the resultant was mixed with the complex oxide particle.

In Example 5-7, a cathode active material was formed as follows. 100 parts by weight of complex oxide particle similar to of Example 5-1 and 10 parts by weight of nickel manganate lithium powder with the average composition of $Li_{1.03}Ni_{0.5}Mn_{0.5}O_2$ and the average particle diameter of 3 μm were treated by a mechanofusion apparatus to form a precursor layer. After that, heat treatment at the rate of temperature increase of 3 deg C./min, the heat treatment temperature of 650 deg C., and retention time of 3 hours was performed, and thereby a coating layer was formed. In the result, the cathode active material was formed.

In Example 5-8, a cathode active material was formed as follows. 100 parts by weight of complex oxide particle similar to of Example 5-1 and 10 parts by weight of nickel-cobalt manganate lithium powder with the average composition of $Li_{1.03}Ni_{0.33}Co_{0.33}Mn_{0.33}O_2$ and the average particle diameter of 3 μm were treated by a mechanofusion apparatus to form a precursor layer. After that, heat treatment at the rate of temperature increase of 3 deg C./min, the heat treatment temperature of 650 deg C., and retention time of 3 hours was performed, and thereby a coating layer was formed. In the result, the cathode active material was formed.

In Example 5-9, a cathode active material was formed as follows. First, as a raw material of the coating layer, lithium carbonate powder, nickel hydroxide powder, and manganese carbonate powder were mixed at a mol ratio of $Li_2CO_3:Ni(OH)_2:MnCO_3=1.08:1.6:0.4$, the resultant was pulverized until the average particle diameter became 1 μm or less to obtain precursor powder. Next, the precursor powder was added to 100 parts by weight of complex oxide particle similar to of Example 5-1 so that the precursor powder became 10 parts by weight when converted to $Li_{1.08}Ni_{0.8}Mn_{0.2}O_2$ was obtained, the resultant was treated by a mechanofusion apparatus to form a precursor layer. After that, heat treatment similar to of Example 5-1 was performed, and thereby a coating layer was formed. In the result, the cathode active material was formed.

Further, as Comparative example 5-1 relative to Examples 5-1 to 5-9, the lithium cobaltate powder used as complex oxide powder in Example 5-1 was directly used as a cathode active material. As Comparative example 5-2, a cathode active material was formed as follows. Lithium carbonate ($Li_2CO_3$) powder, cobalt hydroxide ($Co(OH)_2$) powder, nickel hydroxide ($Ni(OH)_2$) powder, and manganese carbonate ($MnCO_3$) powder were mixed at a mol ratio of $Li_2CO_3:Co(OH)_2:Ni(OH)_2:MnCO_3=0.52:0.91:0.045:0.045$, the resultant was pulverized by a ball mill until the average particle diameter became 1 μm or less. After that, heat treatment at the rate of temperature increase of 3 deg C./min, the heat treatment temperature of 900 deg C., and retention time of 3 hours was performed. Thereby, the cathode active material was formed.

As Comparative example 5-3, a cathode active material was formed in the same manner as in Example 5-1, except that the heat treatment temperature was 1000 deg C. As Comparative example 5-4, a cathode active material was formed in the same manner as in Example 5-1, except that precursor powder obtained by mixing lithium carbonate ($Li_2CO_3$) powder and nickel hydroxide ($Ni(OH)_2$) powder at a mol ratio of $Li_2CO_3:Ni(OH)_2=0.54:1$ was used as a raw material of the coating layer, and the heat treatment temperature was 700 deg C. As Comparative example 5-5, a cathode active material was formed in the same manner as in Example 5-1, except that precursor powder obtained by mixing lithium carbonate ($Li_2CO_3$) powder and magnesium carbonate ($MnCO_3$) powder at a mol ratio of $Li_2CO_3:MnCO_3=1:4$ was used as a raw material of the coating layer, and the heat treatment temperature was 900 deg C.

For the formed cathode active materials of Examples 5-1 to 5-9 and Comparative examples 5-1 to 5-5, powder X-ray diffraction measurement by using Cu-Kα1 as an X-ray source was performed. For the X-ray diffraction apparatus, RINT 2000 of Rigakudenki Co. was used. The X-ray tube voltage was 40 kV, the current was 200 mA, the divergence slit was 0.5 deg, the scattering slit was 0.5 deg, the photo acceptance slit width was 0.15 mm, and a monochromator was used. The measurement was performed under the conditions that the scanning speed was 2 deg/min, the scanning step was 0.02 deg, and the scanning axis was 2θ/θ. Of the foregoing, measurement profiles obtained for Example 5-1, Example 5-3, and Comparative example 5-2 were shown in FIGS. 6, 7, and 8 as representative examples.

Figure 6:
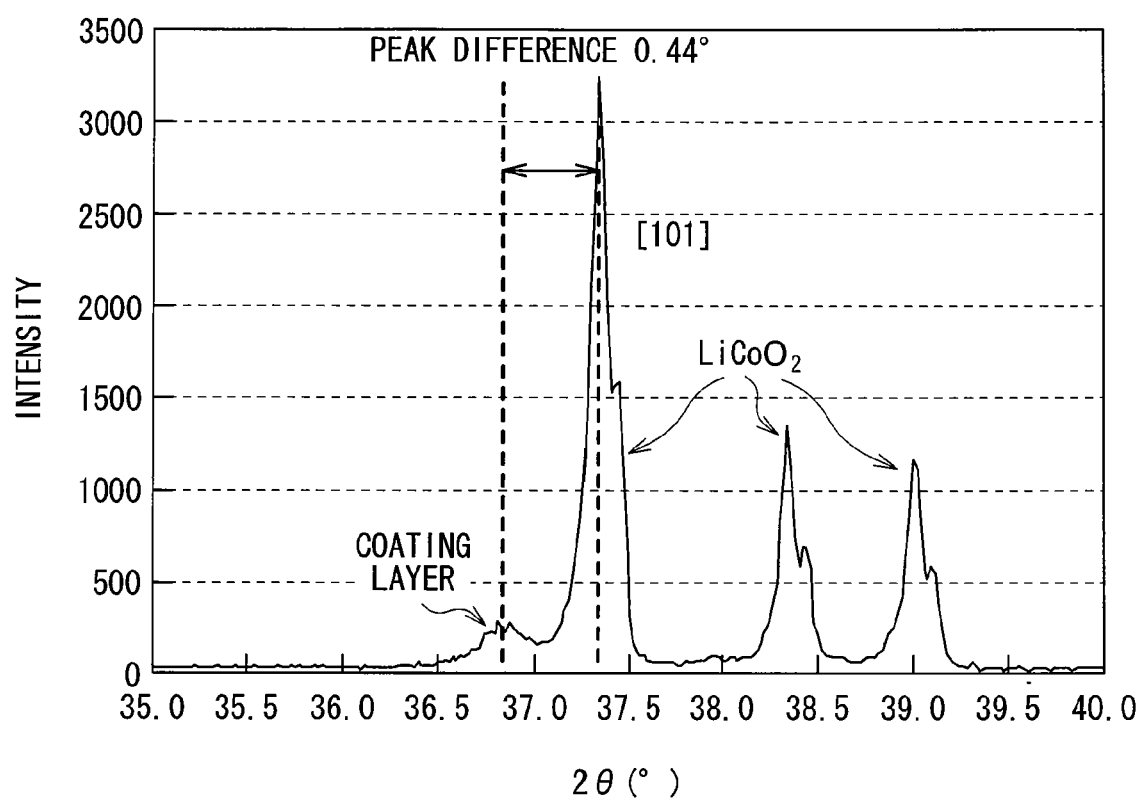
FIG. 6 is a powder X-ray diffraction measurement profile of a cathode active material according to Example 1-1.
Figure 7:
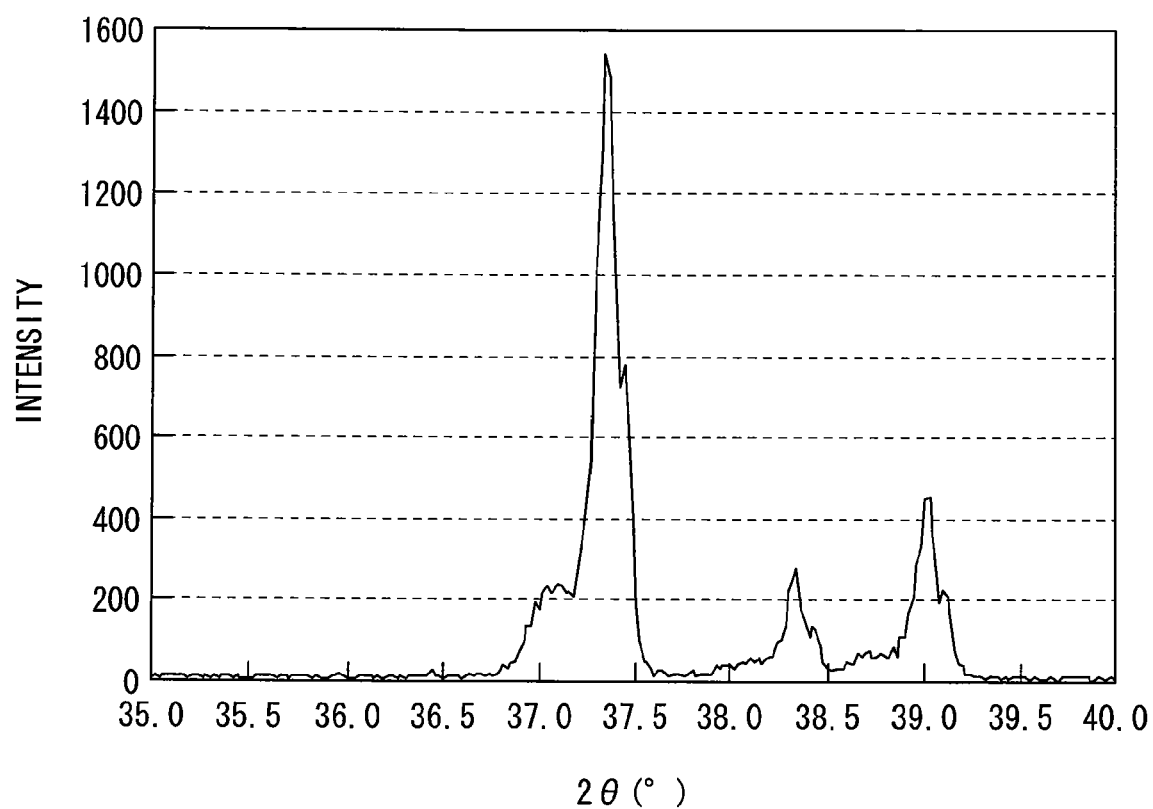
FIG. 7 is a powder X-ray diffraction measurement profile of a cathode active material according to Example 1-3.

In the result, as shown in FIGS. 6 and 7, for all Examples 5-1 to 5-9, a diffraction peak of the complex oxide particle having a bedded salt structure and a diffraction peak of the coating layer which seems to correspond to the lithium oxide containing nickel and manganese were observed. The difference of diffraction angle 2θ between the diffraction peak belonging to the face [101] of the complex oxide particle shown in the vicinity of 37 deg and the diffraction peak of the coating layer located on the lower angle side was 0.44 deg for Example 5-1, 0.40 deg for Example 5-2, 0.24 deg for Example 5-3, 0.52 deg for Example 5-4, 0.44 deg for Example 5-5, 0.35 deg for Example 5-6, 0.80 deg for Example 5-7, 0.58 deg for Example 5-8, and 0.37 deg for Example 5-9. The results are shown in Table 5. As described in the embodiments, the diffraction angle of each diffraction peak was read at the peaktop position of the obtained measurement profile.

Figure 8:
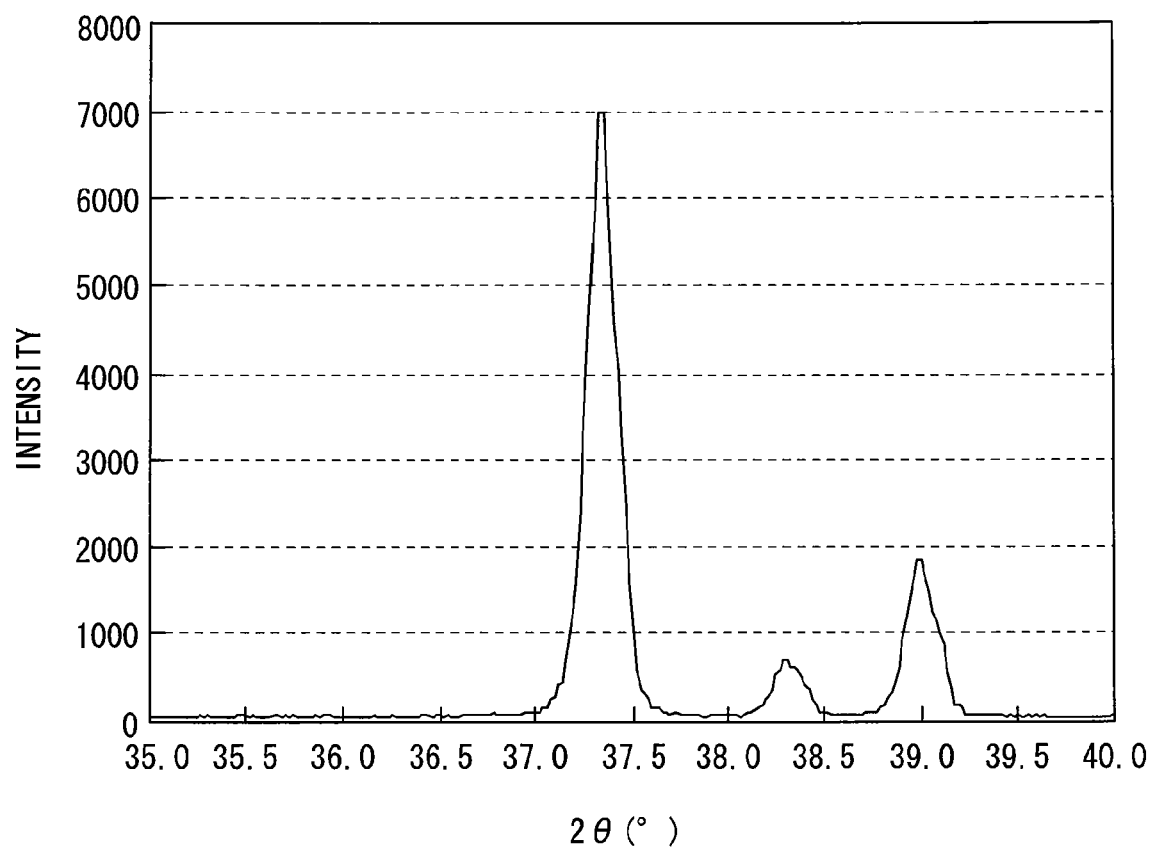
FIG. 8 is a powder X-ray diffraction measurement profile of a cathode active material according to Comparative example 1-2.

Meanwhile, as shown in FIG. 8, in Comparative examples 5-1 to 5-2, a diffraction peak of the complex oxide having a bedded salt structure was observed. There was one diffraction peak belonging to the face [101] shown in the vicinity of 37 deg. In Comparative examples 5-3 to 5-5, the diffraction peak of the complex oxide particle and the diffraction peak of the coating layer were observed similarly to in Examples 5-1 to 5-9. The difference of diffraction angle 2θ between the diffraction peak belonging to the face [101] of the complex oxide particle and the diffraction peak of the coating layer located on the lower angle side was 0.1 deg or less in Comparative examples 5-3 and Comparative example 5-4, and 1.10 deg in Comparative example 5-5. The results thereof are shown in Table 5 together.

Further, the formed cathode active materials of Examples 5-1 to 5-9 were observed by using Scanning Electron Microscope (SEM) and Energy Dispersive X-ray Fluorescence Spectrometer (EDX). It was shown that oxide particle containing nickel and manganese with the particle diameter from 0.1 μm to 5 μm were adhered to the surface of the complex oxide particle, and nickel and manganese existed approximately uniformly on the surface of the complex oxide particle. The average particle diameter of the cathode active material was in the range from 2 μm to 50 μm.

Next, by using such formed cathode active materials, the secondary battery as shown in FIGS. 2 and 3 was fabricated in the same manner as in Example 1-1.

For the fabricated secondary batteries of Examples 5-1 to 5-9 and Comparative examples 5-1 to 5-5, charge and discharge were performed at 45 deg C., and the initial capacity and the cycle characteristics were examined. For the charge, constant current charge was performed at a constant current of 1000 mA until the battery voltage reached 4.4 V, and then constant voltage charge was performed at a constant voltage until the total charging time became 2.5 hours to obtain a full charge state. For the discharge, constant current discharge at a constant current of 800 mA was performed until the battery voltage reached 3.0 V to obtain a full discharge state. The initial capacity means a discharging capacity at the first cycle. The cycle characteristics were obtained by the capacity retention ratio of the discharging capacity at the 200th cycle to the initial capacity as (discharging capacity at the 200th cycle/ initial capacity)×100. The obtained results are shown in Table 5.

TABLE 5

| | Charging voltage: 4.4 V | | | |
|---|---|---|---|---|
| | Complex oxide particle | Coating layer | Difference 2θ of diffraction peaks (deg) | Initial capacity (Wh) | Capacity retention ratio (%) |
| Example 5-1 | $Li_{1.03}CoO_2$ | $Li_{1.08}Ni_{0.5}Mn_{0.5}O_2$*1 | 0.44 | 9.1 | 80 |
| Example 5-2 | | | 0.40 | 9.1 | 81 |
| Example 5-3 | | | 0.24 | 9.1 | 79 |
| Example 5-4 | | | 0.52 | 9.1 | 81 |
| Example 5-5 | | | 0.44 | 9.1 | 82 |
| Example 5-6 | $Li_{1.03}Co_{0.98}Al_{0.01}O_2$ | | 0.35 | 9.1 | 86 |
| Example 5-7 | $Li_{1.03}CoO_2$ | $Li_{1.03}Ni_{0.5}Mn_{0.5}O_2$ | 0.80 | 9.0 | 74 |
| Example 5-8 | | $Li_{1.03}Ni_{0.33}Co_{0.33}Mn_{0.33}O_2$ | 0.58 | 9.1 | 72 |
| Example 5-9 | | $Li_{1.08}Ni_{0.8}Mn_{0.2}O_2$*2 | 0.37 | 9.2 | 83 |
| Comparative example 5-1 | | $Li_{1.03}CoO_2$ | — | 9.2 | 48 |
| Comparative example 5-2 | | $Li_{1.04}Ni_{0.045}Co_{0.91}Mn_{0.045}O_2$*3 | — | 9.0 | 55 |
| Comparative example 5-3 | $Li_{1.03}CoO_2$ | $Li_{1.08}Ni_{0.5}Mn_{0.5}O_2$*1 | 0.1 or less | 9.1 | 57 |
| Comparative example 5-4 | | $Li_{1.08}NiO_2$*4 | 0.1 or less | 8.9 | 61 |
| Comparative example 5-5 | | $LiMn_2O_4$*5 | 1.10 | 8.7 | 64 |

*1 The mixture of $Li_2CO_3$:$Ni(OH)_2$:$MnCO_3$ = 1.08:1:1(mol ratio) was fired.
*2 The mixture of $Li_2CO_3$:$Ni(OH)_2$:$MnCO_3$ = 1.08:1.6:0.4 (mol ratio) was fired.
*3 The mixture of $Li_2CO_3$:$Co(OH)_2$:$Ni(OH)_2$:$MnCO_3$ = 0.52:0.91:0.045:0.045 (mol ratio) was fired.
*4 The mixture of $Li_2CO_3$:$Ni(OH)_2$ = 0.54:1 (mol ratio) was fired.
*5 The mixture of $Li_2CO_3$:$MnCO_3$ = 1:4 (mol ratio) was fired.

As shown in Table 5, according to Examples 5-1 to 5-9 having the diffraction peak of the coating layer on the lower angle side in the range from 0.2 deg to 1.0 deg than the diffraction peak belonging to the face [101] of the complex oxide particle, the initial capacity was almost equal to that of Comparative examples 5-1 and 5-2 with no coating layer provided but the capacity retention ratio could be significantly improved. Meanwhile, in Comparative examples 5-3 and 5-4 having the diffraction peak of the coating layer on the lower angle side in the range under 0.2 deg than the diffraction peak belonging to the face [101] of the complex oxide particle, and in Comparative examples 5-5 having the diffraction peak of the coating layer on the lower angle side in the range over 1.0 deg than the diffraction peak belonging to the face [101] of the complex oxide particle, though the capacity retention ratio could be improved than in Comparative examples 5-1 and 5-2, the improvement degree was slight. Further, in Comparative examples 5-4 and 5-5, the initial capacity was lowered.

That is, it was found that when there was the diffraction peak of the coating layer on the lower angle side in the range from 0.2 deg to 1.0 deg than the diffraction peak belonging to the face [101] of the complex oxide particle, the capacity could be increased, and the high temperature characteristics and the cycle characteristics could be improved.

Examples 6-1 to 6-4

Cathode active materials and secondary batteries were fabricated in the same manner as in Example 5-2, except that the coating amount of the coating layer to the complex oxide particle was changed as shown in Table 6. For the formed cathode active materials of Examples 6-1 to 6-4, powder X-ray diffraction measurement by using Cu-K$\alpha$1 as an X-ray source was performed in the same manner as in Example 5-2. In the result, similarly to in Example 5-2, the diffraction peak of the complex oxide particle and the diffraction peak of the coating layer were observed. The difference of diffraction angle 2θ between the diffraction peak belonging to the face [101] of the complex oxide particle and the diffraction peak of the coating layer located on the lower angle side was 0.28 deg for Example 6-1, 0.36 deg for Example 6-2, 0.42 deg for Example 6-3, and 0.45 deg for Example 6-4. That is, the foregoing values were all in the range from 0.2 deg to 1.0 deg. Further, for the fabricated secondary batteries of Examples 6-1 to 6-4, the initial capacity and the cycle characteristics were examined in the same manner as in Example 5-2. The results are shown in Table 6.

As shown in FIG. 6, according to Examples 6-1 to 6-4, the capacity retention ratio could be significantly improved similarly to in Example 5-2. Further, there was a tendency that as the amount of the coating layer was increased, the capacity retention ratio was improved but the initial capacity was lowered. That is, it was found that the amount of the coating layer was preferably in the range from 2 wt % to 30 wt % of the complex oxide particle, and more preferably in the range from 5 wt % to 20 wt %.

Examples 7-1 to 7-3

Secondary batteries were fabricated in the same manner as in Example 5-1, except that the same cathode active material as of Example 5-1 was used, and the amounts of the cathode active material and the anode active material were adjusted so that the open circuit voltage in full charge was 4.2 V, 4.3 V, or 4.5 V. Further, as Comparative examples 7-1 to 7-3 relative to Examples 7-1 to 7-3, secondary batteries were fabricated in the same manner as in Example 1-1, except that the same cathode active material as of Comparative example 5-1, that is, the lithium cobaltate used for the complex oxide particle in Example 5-1 was used as a cathode active material, and the amounts of the cathode active material and the anode active material were adjusted so that the open circuit voltage in full charge was 4.2 V, 4.3 V, or 4.5 V.

For the fabricated secondary batteries of Examples 7-1 to 7-3 and Comparative examples 7-1 to 7-3, charge and discharge were performed in the same manner as in Example 5-1, and the initial capacity and the cycle characteristics were examined. Then, the charging voltage was changed from 4.2 V, 4.3 V, to 4.5 V. The results are shown in Table 7.

TABLE 6

| | | Coating layer | | Difference 2θ of | Capacity | |
|---|---|---|---|---|---|---|
| | Complex oxide particle | Composition | Coating amount (wt %) | diffraction peaks (deg) | Initial capacity (Wh) | retention ratio (%) |
| | | Charging voltage: 4.4 V | | | | |
| Example 6-1 | $Li_{1.03}CoO_2$ | $Li_{1.08}Ni_{0.5}Mn_{0.5}O_2$* | 2.5 | 0.28 | 9.2 | 70 |
| Example 6-2 | | | 5 | 0.36 | 9.2 | 73 |
| Example 5-2 | | | 10 | 0.40 | 9.1 | 81 |
| Example 6-3 | | | 20 | 0.42 | 8.9 | 84 |
| Example 6-4 | | | 50 | 0.45 | 8.2 | 84 |

*The mixture of $Li_2CO_3$:$Ni(OH)_2$:$MnCO_3$ = 1.08:1:1(mol ratio) was fired.

TABLE 7

| | Complex oxide particle | Coating layer | Difference 2θ of diffraction peaks (deg) | Charging voltage (V) | Initial capacity (Wh) | Capacity retention ratio (%) |
|---|---|---|---|---|---|---|
| Example 7-1 | $Li_{1.03}CoO_2$ | $Li_{1.08}Ni_{0.5}Mn_{0.5}O_2$* | 0.44 | 4.2 | 8.1 | 90 |
| Example 7-2 | | | | 4.3 | 8.5 | 88 |
| Example 5-1 | | | | 4.4 | 9.1 | 80 |
| Example 7-3 | | | | 4.5 | 9.6 | 73 |
| Comparative example 7-1 | | $Li_{1.03}CoO_2$ | — | 4.2 | 8.1 | 82 |
| Comparative example 7-2 | | | | 4.3 | 8.5 | 78 |
| Comparative example 5-1 | | | | 4.4 | 9.2 | 48 |
| Comparative example 7-3 | | | | 4.5 | 9.5 | 36 |

*The mixture of $Li_2CO_3:Ni(OH)_2:MnCO_3 = 1.08:1:1$ (mol ratio) was fired.

As shown in Table 7, according to Comparative examples 5-1 and 7-1 to 7-3 with no coating layer provided, as the charging voltage was increased, the initial capacity was improved, but the capacity retention ratio was significantly lowered. Meanwhile, according to Examples 5-1 and 7-1 to 7-3 provided with the foregoing coating layer, the lowering degree of the capacity retention ratio was small, and could be significantly improved compared to in Comparative examples 5-1 and 7-1 to 7-3. Further, the more the charging voltage was increased, the larger the effect was. That is, it was found that when the battery voltage was higher than 4.2 V, higher effects could be obtained.

The invention has been described with reference to the embodiments and the examples. However, the invention is not limited to the foregoing embodiments and examples, and various modifications may be made. For example, in the foregoing embodiments or the foregoing examples, descriptions have been given of the case using the electrolytic solution which is a liquid electrolyte or the gelatinous electrolyte in which an electrolytic solution is held by a high molecular weight compound. However, other electrolyte may be used. As other electrolyte, for example, a high molecular weight electrolyte in which an electrolyte salt is dispersed in a high molecular weight compound having ion conductivity, an inorganic solid electrolyte made of ion conductive ceramics, ion conductive glass, ionic crystal or the like, a fused salt electrolyte, or a mixture thereof can be cited.

Further, in the foregoing embodiments and the foregoing examples, descriptions have been given of the so-called lithium ion secondary battery in which the anode capacity is expressed by a capacity component due to insertion and extraction of lithium. However, the invention can be similarly applied to so-called lithium metal secondary batteries in which lithium metal is used for the anode active material, and the anode capacity is expressed by a capacity component due to precipitation and dissolution of lithium, or can be applied to secondary batteries in which by setting the charging capacity of the anode material capable of inserting and extracting lithium smaller than the charging capacity of the cathode, the anode capacity contains a capacity component due to insertion and extraction of lithium and a capacity component due to precipitation and dissolution of lithium, and the anode capacity is expressed by the sum thereof.

Further, in the foregoing embodiments and the foregoing examples, descriptions have been given of the secondary battery having the spirally wound structure. However, the invention can be similarly applied to the secondary batteries having other structure such as a structure in which the cathode and the anode are folded and a structure the cathode and the anode are layered. In addition, the invention can be applied to secondary batteries having other shape such as a coin-type battery, a button-type battery, and a square-type battery in addition, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. A cathode active material comprising more than one complex oxide particle, each complex oxide particle made of:
    an oxide particle core containing at least lithium (Li) and cobalt (Co); and
    a coating layer on at least part of the oxide particle core, wherein,
        the coating layer is made of an oxide containing lithium and at least nickel and manganese,
        a concentration of manganese in an outer portion of the coating layer is higher than that in an inner portion of the coating layer,
        a concentration of nickel in an outer portion of the coating layer is higher than that in an inner portion of the coating layer, and
        the amount of the coating layer is 0.5 wt% to 50 wt% of the complex oxide particle.

2. The cathode active material according to claim 1, wherein the composition of the oxide particle core is expressed by Chemical formula 1:

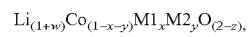

where,
    M1 represents at least one selected from the group consisting of magnesium (Mg), aluminum (Al), titanium (Ti), and zirconium (Zr),
    M2 represents at least one selected from the group consisting of boron (B), vanadium (V), chromium (Cr), manganese (Mn), iron (Fe), nickel (Ni), copper (Cu), zinc (Zn), molybdenum (Mo), tin (Sn), tungsten (W), yttrium (Y), niobium (Nb), calcium (Ca), and strontium (Sr), and
    each of w, x, y, and z are respectively in the range of $-0.10 \leq w \leq 0.10$, $0.001 < x < 0.10$, $0 \leq y < 0.40$, and $-0.10 \leq z \leq 0.20$.

3. The cathode active material according to claim 1, wherein:

(a) the composition of the oxide particle core is expressed by Chemical formula 2, and
(b) Chemical formula 2 is:

$$Li_{(1+x)}Co_{(1-y)}M_yO_{(2-z)},$$

where M represents at least one selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca), and strontium (Sr), and each of x, y, and z respectively are in the range of $-0.10 \leq x \leq 0.10$, $0 \leq y < 0.50$, and $-0.10 \leq z \leq 0.20$.

4. The cathode active material according to claim 3, wherein the mole ratio of nickel to manganese in the coating layer is in the range from 90:10 to 30:70.

5. The cathode active material according to claim 1, wherein:
(a) the composition of the oxide particle core is expressed by Chemical formula 3,
(b) in diffraction peaks obtained by CuKα powder X-ray diffraction, there is a diffraction peak of the coating layer on the lower angle side in the range from 0.2 deg to 1.0 deg than diffraction angle 2θ of a diffraction peak belonging to face [101] of the complex oxide particle, and (c) Chemical formula 3 is:

$$Li_{(1+x)}Co_{(1-y)}M_yO_{(2-z)},$$

where, M represents at least one selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca), and strontium (Sr), and each of x, y, and z are respectively in the range of $-0.10 \leq x \leq 0.10$, $0 \leq y < 0.50$, and $-0.10 \leq z \leq 0.20$.

6. The cathode active material according to claim 5, wherein the composition ratio between nickel and manganese in the coating layer to a mole ratio of nickel: manganese is in the range from 90:10 to 30:70.

7. The cathode active material according to claim 1, wherein the oxide of the coating layer further contains at least one selected from the group consisting of cobalt (Co), magnesium, aluminum, titanium, zirconium, boron, vanadium, chromium, iron, copper, zinc, molybdenum, tin, tungsten, yttrium, niobium, calcium, and strontium.

8. The cathode active material according to claim 1, wherein the average particle diameter of the complex oxide particle is in the range from 2.0 μm to 50 μm.

* * * * *